United States Patent
Brodt et al.

(10) Patent No.: US 10,180,946 B2
(45) Date of Patent: *Jan. 15, 2019

(54) CONSISTENT EXECUTION OF PARTIAL QUERIES IN HYBRID DBMS

(71) Applicant: International Business Machines Corporation, Armonk, NY (US)

(72) Inventors: Andreas Brodt, Gerlingen (DE); Daniel Martin, Sutttgart (DE); Jens P. Mueller, Stuttgart (DE); Oliver Schiller, Dettingen (DE); Knut Stolze, Hummelshain (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/807,895

(22) Filed: Nov. 9, 2017

(65) Prior Publication Data
US 2018/0067962 A1  Mar. 8, 2018

Related U.S. Application Data

(63) Continuation of application No. 15/234,009, filed on Aug. 11, 2016.

(51) Int. Cl.
*G06F 17/30* (2006.01)
(52) U.S. Cl.
CPC .. *G06F 17/30174* (2013.01); *G06F 17/30477* (2013.01); *G06F 17/30522* (2013.01)
(58) Field of Classification Search
CPC ......... G06F 17/30174; G06F 17/30477; G06F 17/30522
See application file for complete search history.

(56) References Cited

U.S. PATENT DOCUMENTS

| 7,613,740 B2 | 11/2009 | Holenstein et al. |
| 8,244,715 B2 | 8/2012 | Cole et al. |
| 8,868,497 B2 | 10/2014 | Yan et al. |

(Continued)

FOREIGN PATENT DOCUMENTS

| WO | 2011144382 A1 | 11/2011 |

OTHER PUBLICATIONS

Funke et al., "HyPer-sonic Combined Transaction and Query Processing", Proceedings of the VLDB Endowment, vol. 4, No. 12, Copyright 2011 VLDB Endowment, pp. 1367-1370.

(Continued)

*Primary Examiner* — Boris Gorney
*Assistant Examiner* — Tiffany Thuy Bui
(74) *Attorney, Agent, or Firm* — Scott S. Dobson

(57) ABSTRACT

The disclosure relates to a system comprising a first and a second database engine and a replication module. The replication module replicates changes from a first database maintained by the first engine to a second database maintained by the second engine. The system maps state times and sync times. The state times are specified in a first temporal reference system used by the first engine and the sync times are specified in a second temporal reference system used by the second engine. Each mapped state time and sync time pair indicate an identical state of the first and second database or parts thereof. The system executes a query partially by the first and partially by the second engine and uses the mapping to execute the query by the first and/or second engine on data of a single defined state.

13 Claims, 8 Drawing Sheets

(56) References Cited

U.S. PATENT DOCUMENTS

| | | | |
|---|---|---|---|
| 9,081,826 | B2 | 7/2015 | Murthy et al. |
| 9,128,972 | B2 | 9/2015 | Raja et al. |
| 9,201,924 | B1 | 12/2015 | Fuller |
| 2007/0183224 | A1 | 8/2007 | Erofeev |
| 2010/0138405 | A1 | 6/2010 | Mihaila et al. |
| 2010/0318495 | A1 | 12/2010 | Yan et al. |
| 2016/0026703 | A1 | 1/2016 | Yadav et al. |
| 2017/0060695 | A1 | 3/2017 | Clare et al. |
| 2017/0212930 | A1 | 7/2017 | Carter et al. |
| 2017/0228422 | A1 | 8/2017 | Zhang et al. |

OTHER PUBLICATIONS

Han et al., "Using temporal tables in DB2 10 for z/Os and DB2 11 for z/Os", IBM Developer Works, Oct. 2014, 12 pages. Last printed Apr. 25, 2016. http://www.ibm.com/developerworks/data/library/techarticle/dm-1410temporal-tables-db2zos/index.html.

Neumann et al., "Fast Serializable Multi-Version Concurrency Control for Main-Memory Database Systems", SIGMOD'15, May 31-Jun. 4, 2015, Melbourne, Victoria, Australia. Copyright is held by the owner/author(s). Publication rights licensed to ACM, 13 pages. http://dx.doi.org/10.1145/2723372.2749436.

List of IBM Patents or Patent Applications Treated as Related, dated Nov. 8, 2017, pp: 1-2.

Brodt et al., "Consistent Execution of Partial Queries in Hybrid DBMS", U.S. Appl. No. 15/234,009, filed Aug. 11, 2016, IBM Docket No. DE920160090US1.

CONSISTENT EXECUTION OF PARTIAL QUERIES IN HYBRID DBMS

BACKGROUND

The present disclosure relates to executing database queries in a hybrid DBMS, and more particularly to executing the queries consistently.

A hybrid DBMS is a database management system (DBMS) comprising at least two database engines and at least two databases, whereby at least a fraction of the data of a first one of the databases is replicated to the second one of the databases where it is organized and stored in a different way than in the first database.

Typically, the two database engines and the way the data is stored and organized in the two databases are optimized for different types of queries. Typically, hybrid DBMSs categorize at least some of the incoming queries and execute each query on the engine that is predicted to be most suited for executing the query.

SUMMARY

According to embodiments of the present disclosure, a computer-implemented method for processing a query against a table in a data processing system is described.

The method involves mapping a state time and a sync time. The state time specified is in a first temporal reference system used by a first engine for maintaining a first instance of a database table. The sync time is specified in a second temporal reference system used by a second engine for maintaining a second instance of the database table. The mapping is the state and sync times is such that the second instance of the table, at a particular sync time, shares a state with the first instance of the table at a state time corresponding to the particular sync time.

The method involves identifying a change made to the first instance of the table. The change may be introduced by a write transaction executed by the first engine at a commit time. The change creates a new state of the first instance of the table. The change is stored in association with a state time indicating the commit time of the write transaction that introduced the change.

The change is asynchronously replicated to the second instance of the table. The replicated change is stored in association with a sync time. The sync time indicates when the change was committed to the second instance of the table and is mapped to the state time indicating the commit time of the write transaction that introduced the change.

A query against the table is received. The query may have at least a first part and a second part. The system may take the following action in response. A query state time is identified. The query state time is the commit time of a write transaction which committed most recently before the receipt of the query. A determination is made that the first part of the query shall be performed by the first engine and the second part of the query shall be performed by the second engine At least the first part of the query is immediately executed against the first instance of the table using the query state time as a filter to exclude any changes in the first table instance having a state time that chronologically follows the identified query state time. The execution of at least the first part of the first query generates a first result.

A query sync time is identified. The query sync time is the time when all changes in the first table instance which committed before the query state time have been replicated to the second instance of the table. The execution of at least of the second part of the query is delayed until the identified query sync time. At least the second part of the query is executed against the second instance of the table using the query sync time as a filter to exclude any changes in the second table instance having assigned a sync time that chronologically follows the identified query sync time. The execution of at least the second part of the query generating a second result.

A combination of the first and second result is returned as a final result.

According to another aspect of the present disclosure, an alternate computer-implemented method for processing a query against a table in a data processing system is described.

The alternate method may involve mapping a state time and a sync time. The state time is specified in a first temporal reference system used by a first engine for maintaining a first instance of a database table. The sync time is specified in a second temporal reference system used by a second engine for maintaining a second instance of the database table. The mapping is such that the second instance of the database table at a particular sync time shares a state with the first instance of the table at a state time mapped to the particular sync time.

A change made to the first instance of the table is identified. The change may be introduced by a write transaction executed by the first engine at a commit time. The change creates a new state of the first instance of the table. The change is stored in association with a state time indicating the commit time of the write transaction that introduced the change.

The change is asynchronously replicated to the second instance of the table. The replicated change is stored in association with a sync time which indicates when the change was committed to the second instance of the table. The sync time is mapped to the state time indicating the commit time of the write transaction that introduced the change.

A query is received against the table. The query may have at least a first part and a second part.

A determination may be made that the first part of the query shall be performed by the first engine and the second part of the query shall be performed by the second engine.

A current sync time may be identified. The current sync time being the most recent sync time having assigned a state time in the mapping. The mapping may be evaluated to identify a history state. The history state time is a time that is mapped to the identified first current sync time.

At least the second part of the query is executed against the second instance of the table using the current sync time as a filter to exclude any changes in the second table instance having assigned a sync time that chronologically follows the identified current sync time. The execution of at least the second part of the query generates a first result.

At least the first part of the query is executed against the first instance of the table using the identified first history state time as a filter to exclude any changes in the first table instance having assigned a state time that chronologically follows the identified history state time. The execution of at least the first part of the query generates a second result.

A combination of the first and second result is returned as a final result.

According to another aspect of the present disclosure, a data processing system is described. The system may comprise at least a first database engine maintaining a first database comprising a first instance of a database table, a second database engine maintaining a second database comprising a second instance the database table, and a replication module.

The data processing system is configured for mapping state times and sync times. The state times are specified in a first temporal reference system used by the first engine for maintaining the first instance of the database table. The sync times are specified in a second temporal reference system used by the second engine for maintaining the second instance of the database table. The mapping used to indicate that the second table instance at a particular sync time shares a state with the first instance of the table at the state time mapped to the particular sync time.

The first engine is configured to execute a plurality of write transactions, and each write transaction introduces a change to the first table instance of the table. Each change is stored in association with a state time indicating the commit time of the write transaction that introduced the change.

The replication module is configured for asynchronously replicating each change, introduced to the first instance of the table, to the second instance of the table. Each replicated change is stored in association with a sync time. The sync time is the time of committing the replicated change in the second table instance and is mapped to the state time indicating the commit time of the write transaction that introduced the change.

The first engine is configured to identify, in response to receiving a query against one of the tables, a query state time. The query state time is the commit time of the write transaction having committed most recently before the receipt of the query.

The data processing system is configured for the following, in response to receiving the first query. A determination is made that a first part of the query shall be performed by the first engine and a second part of the query shall be performed by the second engine.

At least the first part of the query is immediately executed against the first instance of the table, by the first engine, using the query state time as a filter to exclude any changes in the first table instance having assigned a state time that chronologically follows the identified query state time. The execution of at least the first part of the query generates a first result.

The mapping is evaluated, by the second engine, to identify a query sync time. The query sync time is the time when all changes in the first table instance having committed before the query state time have been replicated. The execution of at least the second part of the first query is delayed until the identified query sync time. At least the second part of the query is executed against the second instance of the table using the query sync time as a filter to exclude any changes in the second table instance having assigned a sync time that chronologically follows the identified query sync time. The execution of at least the second part of the query generates a second result.

A combination of the first and second result is returned as a final result.

The above summary is not intended to describe each illustrated embodiment or every implementation of the present disclosure.

BRIEF DESCRIPTION OF THE DRAWINGS

In the following embodiments of the disclosure are explained in greater detail, by way of example only, making reference to the drawings in which.

DETAILED DESCRIPTION

In the following, a method with some alternatives is described using an assignment of time pairs specified in different temporal reference systems for allowing consistent query execution by two database engines respectively making use of one of the temporal reference systems. A key challenge for hybrid DBMSs is to ensure, with low computational overhead, data consistency and the computation of the same result irrespective of the engine used for performing the query.

In one aspect, referred to herein as a "current data approach," the method may be used for processing a query against a table in a data processing system. The data processing system may generally contain at least a first database engine, a second database engine and a replication module. The first database engine may generally maintain a first instance of a database table, and the second database engine a second instance of the table, replicated by the replication module.

Figure 1:
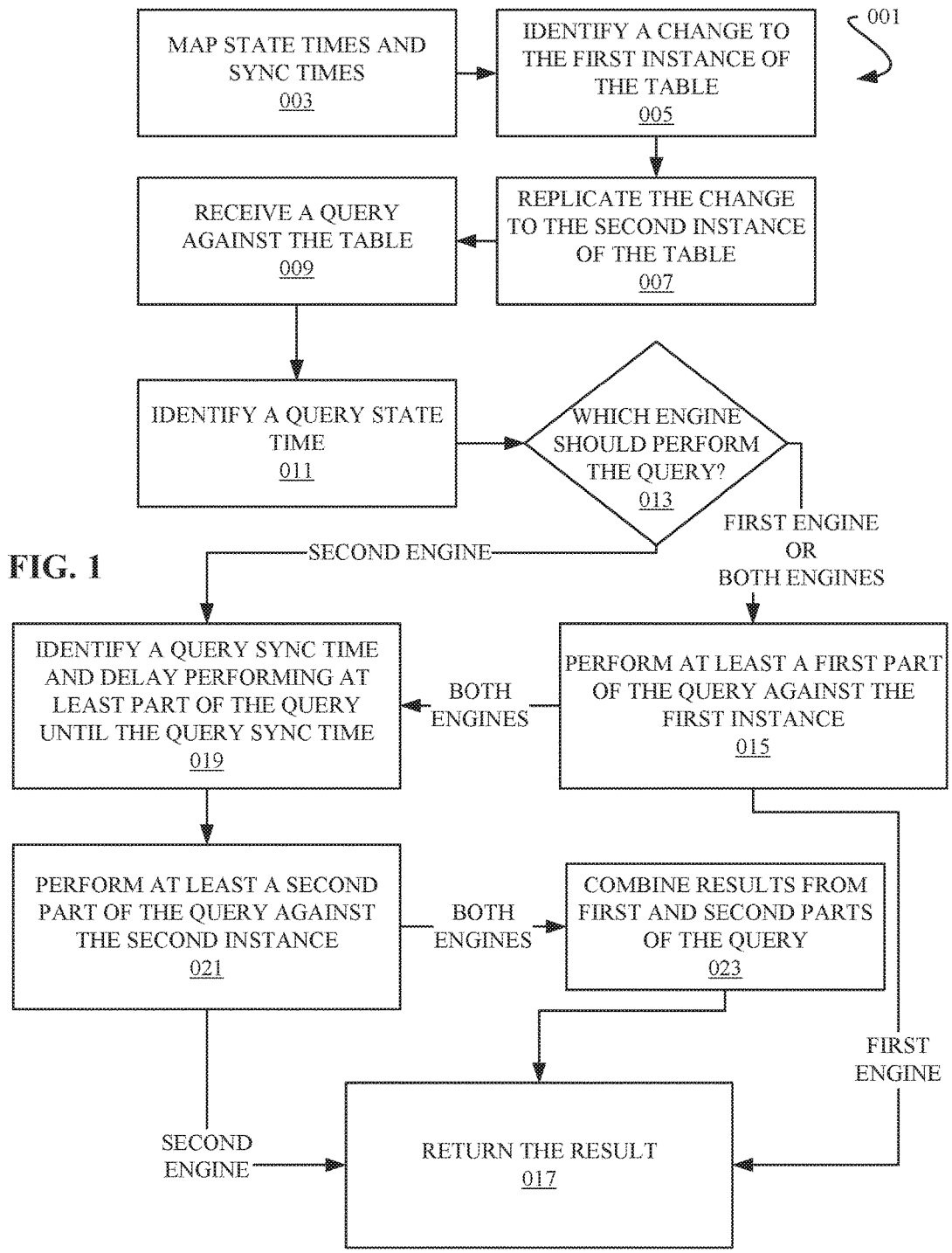
FIG. 1 depicts an example method of the "current data approach" as a flowchart according to an embodiment of the present disclosure.

Referring now to FIG. 1, an example method of the "current data approach" is depicted as a flowchart 001.

The method may involve mapping state times and sync times, as in operation 003. The state times may be specified in a first temporal reference system used by the first engine for maintaining a first instance of a database table. The sync times may be specified in a second temporal reference system used by the second engine for maintaining a second instance of the database table. The mapping may generally indicate that the second table instances at a particular sync time have the same state as the first instances of the tables at the state time mapped to the particular sync time.

A change made to the first instance the table may be identified, as in operation 005. The change may generally be introduced by a write transaction executed by the first engine. The change may be stored in association with a state time (specified in the first temporal reference system) indicating the commit time of a write transaction that introduced the relevant change.

The method may also involve the replication module replicating, to the second instance of the table, changes introduced to the first instance of the table, as in operation 007. Each replicated change may be stored in association with a sync time (specified in the second temporal reference system) set when the particular replicated change is committed to the second instance of the table.

A query may be received against the table, as in operation 009, and in response a query state time may be identified, as in operation 011. The query state time may generally be identified by the first engine. The query state time may generally be the commit time of the one of the plurality of write transactions having committed most recently before the receipt of the query.

Further in response to receiving the query, a determination may be made as to which engine will execute the query, as in decision block 013. This determination may generally be made by the data processing system. In this example, describing two engines, the options of which engine should execute the query are: a) the query shall be performed completely by the first engine or b) the query shall be performed completely by the second engine or c) a first part of the query shall be performed by the first engine and a second part of the query shall be performed by the second engine.

If the determination is a) the query shall be performed completely by the first engine or c) a first part of the query shall be performed by the first engine and a second part of the query shall be performed by the second engine, then at least a first part of the query (the complete query if the determination is that it should be performed completely by the first engine) may be performed against the first instance of the table by the first engine, as in operation 015. The query may be performed using the query state time as a filter to exclude any changes in the first table instance having assigned a state time that chronologically follows the identified query state time. The execution of at least the first part of the query generates a first result.

In the case of a), the query shall be performed completely by the first engine, the first result is returned as the final result, as in operation 017.

In the case of c) a first part of the query shall be performed by the first engine and a second part of the query shall be performed by the second engine, a query sync time may be identified, and the performance of at least a second part of the query delayed until the query sync time, as in operation 019. The query sync time may be identified by evaluating the mapping, for example by the second engine. The query sync time being a time when all changes in the first instance of the table committed before the query state time have been replicated to the second instance of the table. The execution of the second part of the query may be delayed until the query sync time to ensure that when the query is performed against the second instance of the table, the second instance of the table will be in the same state as the first instance of the table was at the time the first part of the query was executed against the first instance of the table.

After the query sync time, at least the second part of the query may be executed, for example by the second engine, against the second instance of the table, as in operation 021. The query may be performed using the query sync time as a filter to exclude any changes in the second table instance having assigned a sync time that chronologically follows the identified query sync time. The execution of at least the second part of the query generates a second result.

The first and second result may be combined to produce a final result, as in operation 023. This final result may be returned, as in operation 017.

If the determination, at decision block 013, is b) the query shall be performed completely by the second engine, then a query sync time may be identified, and the performance of the complete query may be delayed until the query sync time, as in operation 019. After the query sync time, the complete query may be executed, for example by the second engine, against the second instance of the table, as in operation 021. The execution of the complete query against the second instance of the table produces a result. The result may be returned as a final result, as in operation 017.

Figure 2:
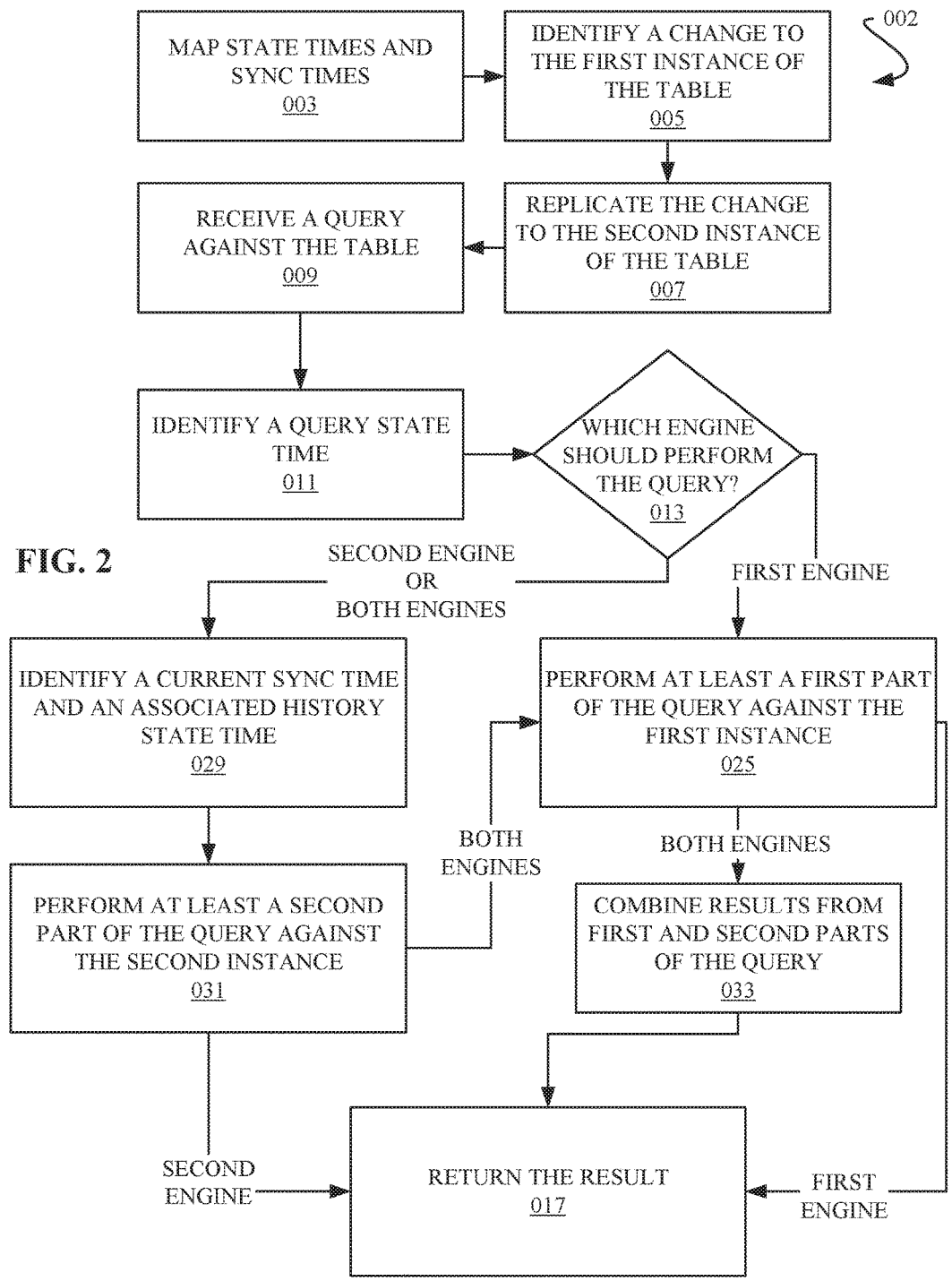
FIG. 2 depicts an example method of the "history data approach" as a flowchart according to an embodiment of the present disclosure.

In a further aspect, referred to herein as a "history data approach," embodiments relate to an alternate computer-implemented method for processing a query against a table in a data processing system. Referring now to FIG. 2, an example method of the "history data approach" is depicted as a flowchart 002.

Up until the performance of the query, the "history data approach" progresses much the same as the "current data approach." State times and sync times are mapped, as in operation 003. A change in a first instance of a table is identified, as in operation 005. The change is replicated to a second instance of the table, as in operation 007. A query against the table is received, as in operation 009. A query state time is identified, as in operation 011. And a determination is made as to which engine should perform the query, as in decision block 013.

This example, as in the above example, describes two engines. So when determining which engine should perform the query, the options are: a) the query shall be performed completely by the first engine or b) the query shall be performed completely by the second engine or c) a first part of the query shall be performed by the first engine and a second part of the query shall be performed by the second engine.

If the determination is b) the query shall be performed completely by the second engine or c) a first part of the query shall be performed by the first engine and a second part of the query shall be performed by the second engine, then a current sync time and a history state time may be identified, as in operation 029.

The current sync time may be identified by the second engine, the current sync time being the most recent sync time having assigned a state time in the mapping (e.g. a current time in the second temporal reference system). The history state time is a state time that is mapped to the identified current sync time, and may be identified by the second engine by evaluating the mapping.

At least the second part of the query (the complete query in the case of b) the query shall be performed completely by the second engine) may be executed against the second instance of the table, as in operation 031. The current sync time may be used as a filter to exclude any changes in the second table instance having assigned a sync time that chronologically follows the identified current sync time. The execution of at least the second part of the query generates a first result.

If the determination was b) the query shall be performed completely by the second engine, then this first result is returned as a final result, as in operation 017.

If the determination was c) a first part of the query shall be performed by the first engine and a second part of the query shall be performed by the second engine, at least a first part of the query may be executed against the first instance of the table, as in operation 025. The execution of the query may use the identified history state time as a filter to exclude any changes in the first table instance having assigned a state time that chronologically follows the identified history state time. The execution of at least the first part of the query generates a second result.

The first and second result may be combined to produce a final result, as in operation 033. This final result may be returned, as in operation 017.

If the determination, at decision block 013, is a) the query shall be performed completely by the first engine, then the complete query may be executed against the first instance of the table, as in operation 025. This execution of the query may generate a third result. This third result may be returned as a final result, as in operation 017.

Embodiments of the disclosure may have several advantages.

According to one beneficial aspect, embodiments of the disclosure may allow executing a first part of a query by a first engine on data contained in a first database and executing a second part of a query by a second engine on data contained in a second database whereby it is ensured to have exactly the same state as the data contained in the first database at a particular moment in time. In the "current data approach", this particular time is the commit time of the one of a plurality of transactions having committed most recently before the hybrid DBMS receives the query that is decided to be executed partially by the first and partially by the second engine. In the "history data approach", this particular time is the time in the past when the data content of the first database was—in respect to all tables shared by the two engines or at least in respect to the tables to be accessed by the received query—in exactly the same state (regarding data content) as the state of the data content of the corresponding table instances in the second database at the moment of receiving the query that is to be executed partially by the first and partially by the second engine.

Ensuring that both engines operate on the same data state can be highly advantageous as it may increase the flexibility of the hybrid DBMS to dispatch received queries completely or even partially to the second DBMS. The dispatching of parts of a query to the second engine may allow for a very fine granular control over which engine should execute a query or even parts thereof. In any case, the query will return a consistent result irrespective of whether it was completely executed by the first engine or by the second engine or partially by the first and partially by the second engine.

Performing a query partially by the first and partially by the second engine may be advantageous for multiple reasons and in many use case scenarios.

As one example, it may happen that the received query accesses tables A, B and C, whereby for tables A and B a respective first instance A1 and B1 exist in the first database and respective second instance A1' and B1' exist in the second database, but for C there exists only an instance C1 in the first database. It may also happen that the second database stores an instance of a table to be accessed that the first database does not store, e.g. temporary analytical tables generated for storing intermediate results. In such a scenario, it was hitherto necessary to execute the whole query by the first engine although the query may be of a type that can be executed much faster by the second engine on the data format of the tables in the second database. And if a state of the art system would, in such a situation, have executed parts of the query relating to table C by the first engine and parts of the query relating to tables A and B by the second engine, any combined result would very likely comprise data that is not consistent. This is because the process that replicates data changes from the first database (tables A1, B1) to the second database (tables A2, B2) typically has some latency time. If a query is split and the generated parts are immediately executed by the first and second engine, the partial results generated by the first engine represent a state of the data that is younger than the state of the data on which the second engine operates to generate the second partial result.

As another example, it may happen that the received query is in part a first statement that can be performed faster by the first engine than by the second engine and is in part a second statement that can be executed faster by the second engine than the first engine. In such a use case scenario, embodiments of the disclosure may dynamically identify the parts of the query that can be performed quicker by the first engine and dispatch those parts for execution to the first engine and dynamically identify the parts of the query that can be performed faster by the second engine and dispatch those parts for execution to the second engine. Thus, the overall performance of query execution may be improved.

Thus, embodiments of the disclosure may provide for a hybrid DBMS in which a query can be executed partially by both the first and second engines on a consistent, unique state of the data that is processed. This takes advantage of the capabilities of first and second engine to process queries or individual structured query language (SQL) statements quickly depending on the type of the query. The final result set will represent a defined and consistent state of the data irrespective of whether the query is executed fully or partially on the first and/or the second engine and on the first and/or second instances of the accessed database tables.

In a further beneficial aspect, data consistency of the data used as a basis for executing the query by the first and/or second engine may be ensured by using (by the first and/or second engine) state times and sync times as filters to ignore all data records having been stored in the first or second database later than the (logical) moment in time that corresponds to the defined logical state of the data. Thereby, the logical moment in time is reflected in the first and second databases by different temporal reference systems. Thus, in case the first engine performs and commits further write statements while executing at least a first part of the query, the changes of the further write statements are filtered out and not considered for result generation. Likewise, in case the second engine or a replication module performs and commits changes specified in one or more replicated transactions or replication batches while executing at least a second part of the query, the changes of the replicated transactions or batches are filtered out and not considered for result generation.

Using the time as a filter condition by both engines may be advantageous, such as if the second engine delays partial query execution until the second database is up to date regarding the state of the first database at the time of receiving the query, new modifications may have happened in the first database meanwhile. Locks to prevent the race conditions between the first and second engines would reduce the performance of the first engine and slow down the execution of other write transactions to be performed in the first database. Embodiments of the disclosure may not need locks to prevent race conditions and to ensure the consistency of data analyzed for processing the query.

In a further beneficial aspect of the "current data approach", it may be ensured that the data is up to date and consistent as the first part of the query may be executed immediately in response to receiving the request while the execution of the second part of the query is delayed until the second database (or at least the tables to be accessed by the query) have "caught up" and have received all the changes of committed transactions which were already stored in the first database but which were not yet replicated to the second database at the moment of receiving the query by the hybrid DBMS. Due to the need of replicating data from the first to the second database, data in the second database may not always contain the latest version of the data contained in the first database. Embodiments of the "current data approach" may delay query execution by the second engine until the second database (or at least the tables to be accessed by the second engine when processing the dispatched query or query parts) contains the latest modifications done in the corresponding tables in the first database.

In case it is determined that the second database is already "in sync" with the first database, the second engine can immediately start to execute the dispatched query or query part(s). By constantly monitoring the mapping and immediately starting execution of at least the second part of the query after the second instance of the table has been determined as being in sync with the state of the first table instance on which the first part of the query is performed, the delay related to executing the second part of the query on a second table that is not yet in sync with the first instance of the table may be minimized In a further beneficial aspect of the "history data approach", it may be ensured that the query is executed immediately in response to receiving the request by the first and/or the second engine. Thus, there is no need to delay the execution of the second part of the query until the second database (or the table instances accessed by the query) has "caught up" with the state of the respective table instances in the first database at the moment of receiving the query. Rather, the second engine can immediately start to operate. Also, after having identified the "state time" of the first database that corresponds to the current sync time of the second database, the first engine can immediately start to operate on the state of the data in the first database that corresponds to the identified "state time". Thus, in the event it is not absolutely necessary for the client application that the analyzed data is the most recent data available, the history data approach may allow avoiding any delay caused by the latency time of the replication process. Running a query on data of an older state may be acceptable for many use cases, particularly when analyzing large time series.

In a further beneficial aspect, data consistency may be achieved with low computational overhead. For example, one traditional approach used in federated databases managing two copies of a database to ensure data consistency is to have all write transactions make their modifications to both copies of the database or individual tables directly. These write transactions and the changes they impose are typically synchronized between the databases using the two-phase commit protocol ("2PC protocol"). However, the 2PC protocol is computationally highly demanding and thus not tolerable in many use case scenarios where quick response times are required. Thus, a query executing according to embodiments of this disclosure may have the advantage that consistent query execution is ensured without generating the computational overhead of the 2PC protocol and similar protocols.

Thus, embodiments of the disclosure may allow ensuring, with low computational overhead, that the hybrid DBMS executes a received query partially on the first and partially on the second engine on a consistent state of the data, (implying that the same result is returned irrespective of whether the query is executed solely by the first, solely by the second or partially by the first and second engines).

According to some examples, the first engine computes the final result by combining the first and second result via a SQL operation selected, for example, from a group comprising: a JOIN operation (e.g. [NOT] IN, [NOT] EXISTS, left/right/full outer JOIN, inner JOIN, etc.), a set operation (e.g. INTERSECT, UNION, EXCEPT), a UNION operation, an arithmetic expression (e.g. "+"), or a function like AVG (first_result, second_result). Optionally, the first engine applies an aggregation operation (e.g. COUNT, AVG, SUM or the like) on the combination of the first and second result for computing the final results. Thus, the first and the second part of the query may be dispatched as SQL sub queries for execution to the first and second engine. A high flexibility of how to combine partial results computed by two or more different engines may be achieved. An example for an SQL statement that combines a first result obtained from a first instance T1 of a table, the first instance being stored in the first database and processed by the first engine, and a second result obtained from a second instance T1' of the table, the second instance being stored in the second database and processed by the second engine, could be:

"SELECT (SELECT SUM(amount) from T1 [. . . ])+ (SELECT SUM(amount) from T1') [. . . ]"

Generating the final result by the DBMS rather than the application may have the advantage that the computation of the final result is typically faster than if performed in the application layer. Moreover, the hybrid DBMS ensures that the returned result set has the same structure and content for any of the cases a) query completed wholly by the first engine, b) query completed wholly by the second engine, and c) query complete in part by the first engine and in part by the second engine.

For example, the first engine may return the final result to the client application having submitted the query. The client application may be an application hosted by an application server program providing a service to a plurality of end user programs and devices. Likewise, the client application program could be a program running on a user's end device. The result may be returned via an SQL interface of the hybrid DBMS.

According to some examples, the determination of whether the received query shall be performed according to a) or b) or c) may involve automatically determining a current latency time for replicating changes from the first table instance to the second table instance of the table and determining that the query shall be executed according to a), wholly by the first engine, if the current latency time exceeds a replication latency time threshold.

In addition, or alternatively, the determination of whether the received query shall be performed according to a) or b) or c) may involve automatically determining that the received query is configured to accesses at least a first and a second table, an instance of the first table being maintained by the first engine but not by the second engine, an instance of the second table being maintained by the second engine but not by the first engine. In response to the determination, determining that the query shall be executed according to c), in part by the first engine and in part by the second engine. Thereby, the query is split into parts such that the part of the query configured to access the first table is dispatched to the first engine and the part of the query configured to access the second table is dispatched to the second engine.

In addition, or alternatively, the determination of whether the received query shall be performed according to a) or b) or c) may involve automatically evaluating metadata of the received query. The metadata may be indicative of whether the query is to be performed according to a), b) or c), and the determination may be that the received query shall be performed in accordance with the indication in the metadata.

In addition, or alternatively, the determination of whether the received query shall be performed according to a) or b) or c) may involve automatically evaluating the received query, whereby the received query may be one or more read statements of a first type and one or more read statements of a second type. The first database engine may be speed-optimized for performing the first type of statement and the second engine may be speed-optimized for performing the second type of statement. The determination may be that the query shall be performed according to c) by performing the statements of the query of the first type by the first database engine and by performing the statements of the query of the second type by the second database engine. For example, the received query may be complex and comprise complex data aggregation and filtering tasks as well as a SELECT clause that operates on a full text String alignment algorithm. The first engine may be able to quickly execute string alignment tasks, e.g. due to a particular way of indexing the data, but may show poor performance in the data aggregation task. The second engine may show poor performance in the string alignment task but may be able to perform the data aggregation task very quickly.

In addition, or alternatively, the determination of whether the received query shall be performed according to a) or b) or c) may involve automatically determining a first current load of one or more first processors used for executing the first engine and/or a second current load of one or more second processors used for executing the second engine, and selecting the one of the options a), b) or c) predicted to most effectively balance the load of the first and second processors. For example, if the load of the first engine is high and the load of the second engine is low, the query may be dispatched to the second engine, at least in a case where the first and second engine are predicted to show a similar performance for the received query.

The determination of whether the received query shall be performed according to a) or b) or c) is performed, for example, by the data processing system, e.g. by a module of a hybrid DBMS hosted by the data processing system which may be the first and the second engine. The module may be referred to as a "dispatcher module".

According to some embodiments, the first engine maintains a first database comprising the first table instance and instances of one or more further tables. The second engine maintaining a second database comprising the second table instance and instances of the one or more further tables. For example, the first engine may be an OLTP engine optimized for performing transactional workload, e.g. a large number of small write transactions, while the second engine may be an OLAP engine optimized for performing analytical workload, e.g. complex analytical read queries. However, other combination of database engine types may likewise be possible, e.g. row vs. column centric databases, hierarchical databases, object oriented databases, document-centric databases and the like.

According to some examples, the first engine maintains a first database comprising the first table instance and first instances of one or more further tables. The second engine maintains a second database comprising the second table instance and second instances of the one or more further tables. The plurality of write transactions may be one or more first write transactions accessing and changing the first instance of the table and comprising one or more second write transactions accessing and changing the first instances of the further tables which are not accessed by the first engine when executing the received query. Thus, some of the plurality of write transactions which are asynchronously replicated to the second database operate on first instances of tables to be accessed by the received query and some operate on first instances of tables which will not be accessed by the received query.

For example, the replication module may bundle multiple write transactions which introduced changes in table instances managed by the first engine in a single transaction or in the form of a transactional batch comprising multiple transactions. The replication module may replicate the single combined transaction or the batch of transactions to the second database. The replication may comprise reloading (parts of) an entire first instance of a table stored in the first database to a respective second instance of the table stored in the second database regularly or by constantly tracking changes introduced to the first table instance by the first engine. For example, the replication module may monitor and analyze a database log of the first engine, extract and bundle all changes imposed by write statements in the first instance of the table and apply them at once in the corresponding table instance in the second database. Depending on the embodiment, the replication module may perform the replication globally for all tables for which both databases comprise a respective instance or may perform the replication on a per-table basis. Performing the replication on a per-table basis may have the advantage that a query that is dispatched completely or partially does not have to wait until all changes of all tables have been replicated. It may be sufficient to delay executing the query or query part by the second engine until the changes in the tables to be accessed by the second engine have been replicated.

According to one embodiment ("table-based replication"), the query state time is identified as the commit time of the one of the first write transactions having committed most recently before the receipt of the query. Thereby, the commit time of the second write transactions are ignored. The replication is performed such that selectively the changes of each of the first write transactions having committed at or before the identified query state time but not the changes of the committed second transactions are replicated. For example, the replication of the changes of the tables to be accessed by the query can be performed in response to receiving the query.

These features may have the advantage that the delay in case of the "current data approach" may be reduced by delaying the replication solely until the instances of the table that are actually accessed by the second engine upon executing the dispatched query or query part have been updated and brought into consistency with the data in the corresponding table instances in the first database at the moment of receiving the query. The second engine may then immediately start executing even if the instances of the other tables in the second database, not to be accessed by the second engine when executing the dispatched query, are still not up-to date.

According to alternative examples ("database wide replication"), the query state time is identified as the commit time of the one of the first and second write transactions having committed in the first database most recently before the receipt of the query. Thereby the commit time of the first and second write transactions are evaluated for identifying the most recently committed write transaction. The replication is performed such that the changes of the first and second write transactions having committed at or before the identified query state time are replicated.

According to examples, the method may involve storing, upon committing each of the write transactions in the first database, a state time of the commit time in association with the changes introduced by the committed transactions in the one or more table instances of the first database. Upon committing each of the replicated write transaction in the second database, a sync time of the commit time is stored in association with the changes introduced by the replication of the transaction in the one or more table instances of the second database. In case the replication is performed in a batch, the changes specified in the batch can be stored in a single transaction in the table instances of the second database and each new or updated data record generated by the replication of the batch has assigned the same sync time. The maintaining of the mapping may involve, upon each transaction having been successfully replicated and committed in the second database, updating the mapping by storing a new assignment of the state time of committing the transaction in the first database and the sync time of committing the replicated transaction in the second database.

This may be advantageous as the mapping may allow the hybrid DBMS to determine, in case of the "current data approach", the moment (and corresponding sync time) when all changes introduced by transactions committed in the first database before the receiving of the query have been successfully replicated to the second database so that the second engine can start executing the second part of the query dispatched to the second engine. Likewise, the mapping may allow the hybrid DBMS to determine, in case of the "history data approach", the moment (and corresponding state time) of the data in the first database which have a state that is identical to the state of the data in the second database at the moment when the data processing system receives the request.

Depending on the embodiment, the determination of the state time-sync time pair that represents the same state of data can be performed globally for all tables of the database. In this case, any change to any of the tables will result, after its replication to the second database, in a new global (database-wide) entry in the mapping.

Alternatively, each entry in the mapping (i.e., each state time-sync time pair representing the same data state) has assigned meta data being indicative of the one or more tables having been changed by a recent write transaction. This information may allow delaying the execution of a query or query parts by the second engine only until the tables to be accessed by the second engine when executing the query or query parts have been replicated irrespective of whether the other tables have also been updated to represent the same state as the database (or the tables) used for generating the first (partial) result.

The mapping may be monitored by a dispatcher module responsible for deciding if and when to dispatch a query or query part for execution to a particular engine. The delaying of the execution of at least the second part of the query by the second engine may be performed until the dispatching module determines that the mapping includes an association of the identified query state time with the identified query sync time.

According to examples, each state time is a time measured by a clock operatively coupled to the first engine upon a commit event of a write transaction in a first database maintained by the first engine. For example, the clock can be a clock of the operating system of an IT-environment hosting the hybrid DBMS. Likewise, the clock could be an internal clock logic of the DBMS or of the first engine.

According to an alternative example, each state time is a transaction-ID generated by the first engine upon a commit event of the transaction.

According to an alternative example, each state time is a log-record-ID generated by the first engine upon logging a commit event of the transaction in a first database maintained by the first engine (e.g. an ARIES or FS-based weighted-average life (WAL) log record ID, an ID of a log entry that is artificially/additionally inserted and does not correspond to a particular SQL statement or transaction ("diagnostic log entry")).

According to an alternative example, each state time is an MVCC version number generated by a first MVCC module operably coupled to the first engine.

Multi-Version Concurrency Control (MVCC) is a method for transaction isolation in which several versions of a database object (such as a row) may exist in parallel. A database engine using MVCC will not modify a row directly upon performing a write transaction but will rather create a modified copy of the row. The MVCC module may in addition implement the snapshot isolation protocol to guarantee that all reads made in a transaction will see a consistent snapshot of the database (in practice it reads the last committed values that existed at the time it started), and the transaction itself will successfully commit only if no updates it has made conflict with any concurrent updates made since that snapshot. Thus, modifications performed by a write transaction Tw are only read by transactions which started after Tw committed and every transaction acts on the consistent snapshot that existed at transaction start.

To distinguish the row versions, every row is assigned, by the first engine using or interoperating with the MVCC module, a creation timestamp that contains the transaction number (also referred to as "transaction start timestamp" or MVCC version number") of the write transaction that created it. As such timestamps have the property of growing strictly monotonously, a row with timestamp tx is only visible to transactions with a transaction number (transaction start timestamp)>tx. Similarly, a delete timestamp marks the point after which a particular version of a row is no longer visible.

For example, every row in the first database is assigned a creation time stamp ("state time") that is provided by the first clock and that grows strictly monotonously. Analogously, every row in the second database is assigned a replication complete time stamp ("sync time") that is provided by the second clock, that grows strictly monotonously and that indicates the time of completing replication of the transaction or transaction batch that created the new row in the second database.

Using an MVCC system as a clock for determining the second times may be advantageous as typical OLAP engines (second engines) use MVCC mechanisms anyway to avoid read locks for long-running analytic queries. So requiring these timestamps on the OLAP engine imposes no additional overhead at all. Thus, the replication module may use the MVCC generated time stamps for ensuring consistent query execution. The parts of the query dispatched to the first and/or second engine are augmented with visibility restrictions that correspond to a particular snapshot of the data represented by a state time and a sync time. The visibility restriction may be implemented as a modification of the SQL command, e.g. the concatenation with an SQL SELECT statement that selectively returns data records of the first database comprising a time stamp that corresponds to the identified state time and that selectively returns data records of the second database comprising a time stamp that corresponds to the identified sync time.

According to examples, each sync time is a time measured by a clock operatively coupled to the second engine upon a commit event of a write transaction in a second database maintained by the second engine. For example, the clock can be a clock of the operating system of an IT-environment hosting the hybrid DBMS. Likewise, the clock could be an internal clock logic of the DBMS or of the second engine.

According to an alternative example, each sync time is a transaction-ID generated by the second engine upon a successful replication of the transaction to a second database maintained by the second engine.

According to an alternative example, each sync time is a log-record-ID generated by the second engine upon logging a successful replication of the transaction to a second database maintained by the second engine (e.g. an ARIES or FS-based WAL log record ID, an ID of a log entry that is artificially/additionally inserted and does not correspond to a particular SQL statement or transaction ("diagnostic log entry")).

According to an alternative example, each sync time is an MVCC version number generated by a second MVCC module operably coupled to the second engine.

According to some examples, the first engine is operatively coupled to or implements the first MVCC module and the second engine is operatively coupled to or implements the second MVCC module. By using the version numbers generated by the first MVCC module as state times and by using the version numbers generated by the second MVCC module as the sync times and by mapping state times and sync times corresponding to the same data state to each other in the mapping, a consistent snapshots isolation level across two different database engines may be implemented without imposing major architectural changes to the hybrid DBMS. Thus, a hybrid DBMS is provided which may achieve a consistent state across transactional engine and analytics accelerator by mapping every timestamp in the analytics accelerator to a corresponding timestamp in the transactional engine which contains exactly the same snapshot of the data. In the analytics accelerator, a partially accelerated query always uses the latest version of a row that was available when query execution started. Using the state time-sync time mapping, the corresponding version (sync time) of the instance of the row in the second database is determined. The parts of the query that run in the second engine then selectively use the determined sync time, thereby ignoring ("filtering out") the latest available snapshot (version) which meanwhile exists in the first database and which may already have been replicated to the second database.

Although using first and second MVCC modules may be advantageous as they already provide a mechanism for generating a continuously increasing series of time stamps and a snapshot isolation mechanisms, other forms of taking a (logical) time stamp may be used as well, e.g. using the log record-IDs of write transactions or the like.

According to some examples, the replication of the changes of the first instances to the second instances of the tables may involve identifying the changes by analyzing a log generated by the first engine upon executing the write transactions and extracting database write statements specified in the log and belonging to the write transactions.

This feature may be advantageous as the log may be generated by the first engine anyway. By analyzing the log for extracting the changes imposed by various write transactions, no additional workload is imposed on the first engine and the log may already comprise state times in the form of log-record IDs.

According to examples, the computer-implemented method may involve assigning, to each transaction to be replicated, a state time indicative of the commit time of the transaction into a first database managed by a first engine. Upon having successfully replicated any one of the transactions to a second database managed by a second engine, a sync time may be determined to be indicative of the time of completing the replication (i.e. storing changes specified in the transaction to second database and committing the storing of the changes. A new entry may be assigned in the mapping, and the new entry may be an assignment of the state time assigned to the transaction and the sync time determined upon successful replication of the transaction.

For example, the second engine interoperating with the replication module or the replication module may perform the above steps for keeping the mapping up to date which again allows the hybrid DBMS to determine if a particular state of the data has already been reproduced in the second database or not and if a query or query part to be executed by the second engine should be delayed or not. Thus, the mapping may be kept up to date automatically.

According to some examples, the replication module generates a replication batch for performing the replication in response to receiving the query. The batch may be changes of the one of the write transactions having committed in a first database maintained by the first engine at or before the receipt of the query. The sync time determined for the replication batch (which is assigned to all new row versions in the second database generated upon replicating the batch) is the time of replicating all changes specified in the batch to the second database. Thus, a plurality of transactions replicated in a batch will have the same sync time. In some example implementations, the batch generated in response to receiving the query selectively contains changes introduced by the above mentioned committed and not replicated transactions which have affected the table (or multiple tables, if applicable) that are to be accessed by the second engine when executing the received query or parts thereof.

It may be possible to use other triggers for generating a replication batch, e.g. the batch reaching a predefined number of transactions or the time of pooling transactions performed in the first database exceeds a time threshold. Using the receipt of the query as a trigger for generating the batch that selectively includes committed and unreplicated changes having committed in the first database before the query was received may be advantageous as the size of the batch is typically small ("mini batches") and thus can be replicated comparatively fast. Moreover, as the replication of the "current state" of at least the ones of the tables in the first database to be accessed by the second engine upon executing the received query is started immediately in response to receiving the query, the replication latency time is comparatively short. Each new version of a row in a table of the second database may be stored in association with the batch-related sync time shared by all new row versions generated by the replication of the batch.

According to example embodiments, the replication module evaluates write statements in the replication batch for identifying multiple write statements configured to modify the same row of the table. The replication module processes the identified multiple write statements and computes a net effect change. A net effect change is a change (e.g. embodied in the form of a new row or a new version of existing rows) that would result if all the identified multiple write statements would be applied on the row. Instead of storing a respective row for each of the identified multiple write statements in the second instance of the table, the replication module solely stores a single new row with the computed net effect change in the second instance of the table.

This may be advantageous as the intermediate results are merely stored in the main memory and only the net effect result is stored as a new version of a row on a non-volatile storage medium. Thus, multiple write operations on a non-volatile storage medium may be avoided, thereby increasing the speed of data replication. For example, the identified multiple write statements comprising statements of at least two different ones of the write transactions executed by the first engine. Combining the batch generation in response to receiving a query that is determined to be dispatched (fully or partially) to the second engine and applying net effect processing for the transactional changes in each batch may be advantageous as a plurality of different data content states in the first database (corresponding to different transaction commit state times) are "logically merged" by mapping them to a single replication batch-related sync time and by reducing the amount of write operations on a non-volatile storage medium. As any query determined to be dispatched fully or partially to the second engine will trigger the generation of a batch, it may not be necessary to replicate and map any change on the level of an individual transaction. It may be sufficient to map the state related to the most recent commit of a write operation by the first engine before receiving a query to be dispatched. This may also reduce the size of the mapping and reduce the computational overhead related to maintaining the mapping of state times and sync times representing the same state of the data (globally or on a per-table basis) in the first and the second database.

According to embodiments, the first and second engines are database engines of a hybrid DBMS. The first engine is solely responsible for managing a first database comprising first instances of a plurality of database tables. The second engine is solely responsible for managing a second database comprising second instances of the plurality of tables, whereby the data of tables having an instance in the first and in the same database the data changes in the first instance is regularly replicated to the second instance of the table. The hybrid DBMS and its two engines may be stored on one or more first data processing machines and the two engine may share the same memory. Alternatively, in some embodiments, the first and second engines may be hosted one or more second data processing machines, the first data processing machines being connected to the second data processing machines via a network.

The mapping with the pairs of state times and sync times representing the same state of the data to be queried may be used, in case of determining that the received query should be executed partially by the first and partially by the second engine according to c), executed in part by the first engine and in part by the second engine, to execute the first part of the received query and the second part of the received query on database table instances maintained by different database engines but having the same state. Thus, irrespective of whether the first and/or second engine is used for executing the query, the returned result will be identical and be derived from a data base or database table snapshot at a defined point in time.

According to some examples, the method may involve automatically identifying all table rows in the first table instance having assigned a state time that is older than the state time used as filter by any query or query part that is currently executed by the first engine and for which a newer row version with a younger state time exists in the first table instance. Once identified, any one of these rows may be marked as a deletion candidate. This process, automatic and asynchronous to the query execution by the first engine, may physically delete the marked table rows from the first database. For example, the steps may be performed by the first engine or by an additional module, application program or plug-in that interoperates with the first engine. For example, these physical delete operations may be implemented as part of the MVCC functionality of a first MVCC module interoperating with the first engine.

According to other examples, the method may involve automatically identifying all table rows in the second table instance having assigned a sync time that is older than the sync time used as filter by any query or query part that is currently executed by the second engine and for which a newer row version with a younger sync time exists in the second table instance; marking any one of the identified table rows as a deletion candidate. Automatic and asynchronous to the query execution by the second engine, the marked table rows may be deleted from the second database. For example, the steps may be performed by the second engine or by an additional module, application program or plug-in that interoperates with the second engine. For example, the physical delete operations may be implemented as part of the MVCC functionality of a second MVCC module interoperating with the second engine.

The feature of identifying and marking rows as deletion candidate as described herein may be different from a function for releasing the space occupied by rows of temporal tables, wherein old versions of rows cannot be automatically deleted from a temporal table as the DBMS cannot exclude that a new query might need exactly that specific version of a row. Deletion of old data in temporal tables must therefore be explicitly controlled by the user.

For example, the first engine can be an OLTP engine, i.e., a database engine configured for efficiently processing transactional workloads (OLTP) comprising very large numbers of small, parallel transactions (in particular write transactions), each of them typically accessing only small amounts of data. A second engine can be a database engine configured for efficiently processing analytical workloads (OLAP), which typically comprise only a small number of transactions (read transactions) which, however, are complex, computation-intensive ("analytical") as they process large amounts of data. The OLTP engine can be viewed as the source of the data, as the transactional workloads originally create, update, and delete the data. In some example systems, data in the second database managed by the second engine, e.g. the OLAP engine, is never modified by analytical workloads. However, the changes done in the transactional copy must be replicated in the analytical copy.

Embodiments disclosed herein can be freely combined with each other as long as they are not mutually exclusive.

The embodiments and examples given in the description and the subject matter of the dependent claims may be combined with the method and system corresponding to the "current data approach" as well as with the method and system corresponding to the "history data approach".

For the sake of simplicity, many examples described herein relate to the situation that the received query accesses a single table. For example, a first statement of the query may process one or more columns of a single particular table and a second statement of the query may process one or more further columns of the particular table. However, the query can likewise be directed at a plurality of different tables and views. In this case, and when a table-based batch replication and state time and sync time mapping is performed, embodiments of the disclosure ensure that at least the table instances in the second database to be accessed by the second engine when executing the dispatched part of the query are in sync with the state of the first instances of the tables in the first database on which the first engine operates.

The present disclosure may describe a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A "hybrid database management system (DBMS)" as used herein is a DBMS comprising at least a first database engine (or first "engine") and a second database engine ("second engine") whereby the first engine is configured to process a query received by the hybrid DBMS on instances of one or more database tables stored in a first database and wherein the second engine is configured to process query received by the hybrid DBMS on instances of the one or more tables stored in a second database. The first and the second engine may be speed optimized for different types of queries and/or data formats. The first and second engines can be installed and run on the same hardware system and can be configured for exchanging data via a system bus. Alternatively, the first and second engine can be hosted on different computers configured for exchanging data via a network connections. In a hybrid DBMS, at least some of the data of the first database is replicated to the second database, therefore the data of at least some tables is available to both engines, but stored in different formats. Thus, every engine owns a copy of some data in its own format that is optimized for the specific workload. The formats differ, for example, in compression, row-oriented vs. column-oriented storage, etc. In a hybrid DBMS, the data of many or all tables managed by the hybrid DBMS is available to both engines, but stored in different formats. Thus, every engine owns a copy of the data of the shared tables in its own format that is optimized for a type of query. Every engine is responsible for managing its own set of instances of the shared tables and the data contained therein. One example of such a hybrid system is IBM DB2 Analytics Accelerator (IDAA), other vendors and system expose similar patterns.

In some example implementations, the write statements are exclusively performed by the first engine on first instances of the shared tables which are stored in the first database. The "write" or "transactional" statements insert, update and delete table rows in the first database which are then asynchronously (asynchronous to the execution of the write and other queries by the first engine) replicated to the second engine. Thus, for tables managed by the second engine, the first engine and the first database may act as a data source.

An "engine" or "database engine" as used herein is the underlying software component that a database management system (DBMS) uses to create, read, update and delete (CRUD) data from a database. Most database management systems include their own application programming interface (API) that allows the user to interact with their underlying engine without going through the user interface of the DBMS. According to embodiments, the DBMS is a hybrid DBMS comprising two or more engines respectively operating on different instances of one or more tables. The hybrid DBMS may comprise a single interface and "hide" the existence of two different engines from the client as the hybrid DBMS may automatically decide which one of its engines is to be used for executing the query.

A "database query" or "query" as used herein is a command to retrieve data from a DBMS, the command being specified in the syntax of the interface of the DBMS.

A "mapping" as used herein is a physical representation of a logical assignment of two objects. For example, a mapping can be represented in the form of a file or a database tables wherein IDs of objects to be assigned are stored in the same row. According to some embodiments, the mapping assigns each state time valid in a first temporal reference system used by the first engine and/or by a first MVCC module to a corresponding sync time valid in a second temporal reference system used by the second engine and or by a second MVCC module, the second database at the sync time comprising exactly the same snapshot of the data of the first database at the assigned state time. The mapping may also be maintained in a table-specific manner In this case, the state time-sync time assignment may be different for different tables.

Figure 3A:
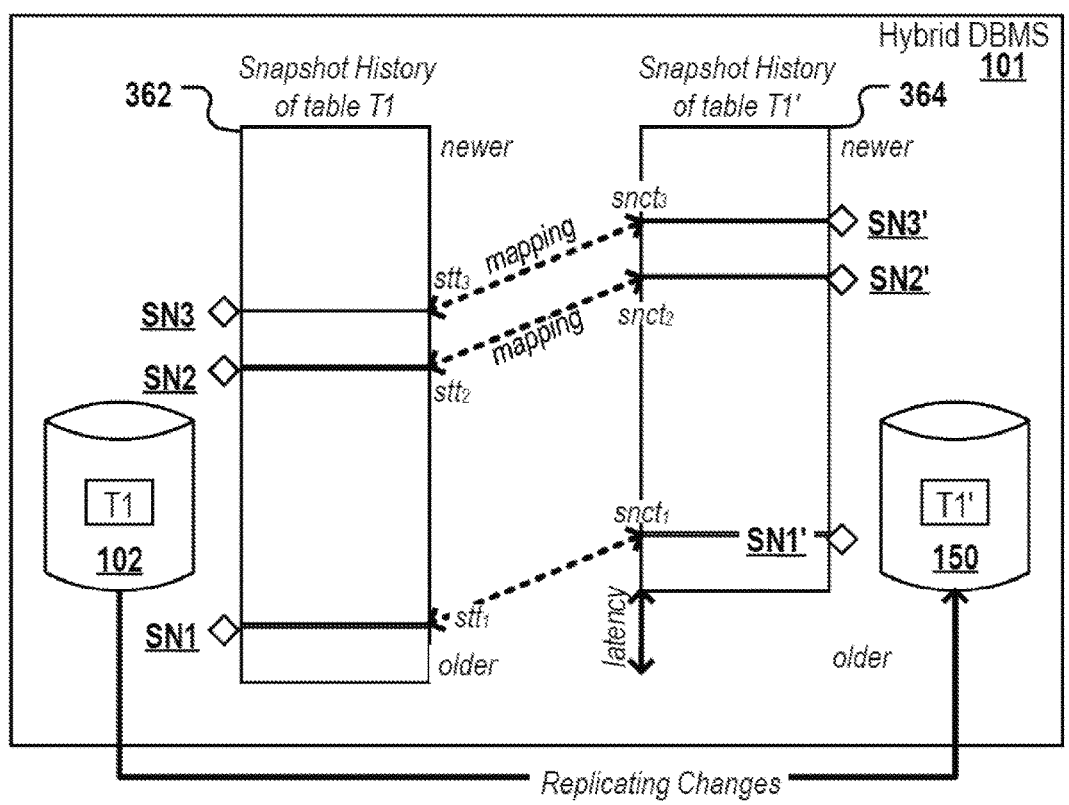
FIG. 3A depicts a hybrid DBMS with snapshot histories of a table copy of a first and a second database respectively managed by different database engines according to an embodiment of the present disclosure.

FIG. 3A depicts a hybrid DBMS 101 comprising a first and a second database engine according to an embodiment of the present disclosure. The figure further depicts a first snapshot history 362 of a table whose first instance is stored in a first database 102 managed by a first database engine and a second snapshot history 364 of a second instance ("copy") of the table stored in a second database 150 managed by a second database engine. The first database 102 includes one or more database tables represented in the figure by a single table T1. The second database 150 also includes one or more tables represented by the table T1'. At least some database tables in the first and second database are configured to store the same data but in different data formats. Thus, one or more tables in the second database are "copies" or "second instances" of database tables ("first table instances") of the first database, whereby changes introduced in the database tables in the first database are replicated—typically with some delay or "latency"—to the corresponding table copies in the second database.

For example, the first engine can be an OLTP engine, i.e., a database engine configured for efficiently processing transactional workloads (OLTP) comprising very large numbers of small, parallel transactions (in particular write transactions), each of them typically accessing only small amounts of data. The second engine can be a database engine configured for efficiently processing analytical workloads (OLAP), which typically comprise only a small number of transactions (read transactions) which, however, are complex, computation-intensive ("analytical") as they process large amounts of data. The OLTP engine can be viewed as the source of the data, as the transactional workloads originally create, update, and delete the data. In some example systems, data in the second database managed by the second engine, e.g. the OLAP engine, is never modified by analytical workloads. However, the changes done in the transactional copy must be replicated in the "analytical" copy.

The snapshot history 362 of table T1 includes three boxes SN1, SN2, and SN3 respectively representing snapshots of table T1 stored in the first database and managed by the first engine. In general, a "snapshot" is the state of a system at a particular point in time. A "snapshot" as used herein is the state of the data content of a whole database or of a particular table therein at a particular time. Thereby, the system for measuring the time and for assigning snapshot IDs or time stamps may be different for the first and for the second database. In the following, a time stamp generated or determined in a first temporal reference system used by the first engine will be referred to as a "state time" (representing the state of the first database or table therein) and a time stamp generated or determined in a second temporal reference system used by the second engine will be referred to as a "sync time" representing the moment at which a particular state of a first instance T1 of a table in the whole first database was successfully replicated to the second instance T1' of the table in the second database.

The history 362 of table T1 includes multiple time stamps illustrated by diamonds which respectively represent the moment when a write transaction that creates one or more additional, new rows or row versions in table T1 commits. Each time stamp generated for a commit event in the first database is referred to as state time.

For example, the diamond next to the label "SN1" and corresponding to state time stt1 is the commit time of a write transaction that introduced changes to table T1 during a time interval. The snapshot "SN1" represents the state of table T1 at the state time stt1 and covers the whole data content of table T1 (including changes introduced by previously committed transactions, if any).

The diamond next to the label "SN2" corresponding to state time stt2 is the commit time of a further write transaction that introduced changes to table T1 during a second time interval. The snapshot "SN2" represents the state of table T1 at the state time stt2 and covers the whole data content of table T1 (including changes introduced by previously committed transactions, e.g. the one having committed at the state time stt1). The diamond next to the label "SN3" corresponding to state time stt3 is the commit time of a further write transaction that introduced changes to table T1 during a third time interval. The snapshot "SN3" represents the state of table T1 at the state time stt3 and covers the whole data content of table T1 including changes introduced by previously committed transactions, e.g. the ones having committed at the state times stt1 and stt2.

The changes introduced to table T1 are regularly replicated by a replication module to a corresponding instance T1' of the table in the second database 150. The replication is asynchronous and has some delay referred herein as "latency". The extraction and optional compression of the data to be replicated will take some time, the data transport via a system bus or via a network to the second database will also take some time and the creation of new data rows in table T1' will also take some time. Whenever one or more changes have been successfully replicated to and committed in the second database, a mapping between corresponding state times and sync times is updated. In the depicted example, the mapping may be table-specific, i.e., the state times and sync times of individual tables are assigned to each other. In the mapping, a new record is created that assigns stt1 to snct1 once the replication of the first snapshot to the second database is completed. A further new record is created that assigns stt2 to snct2 in response to the completion of the replication of the second snapshot to the second database. And so on. In the depicted embodiments, each commit time (state time) of a write transaction in the first database corresponds to a transaction replication sync time in the second database.

However, it is possible that a plurality of write transactions is pooled in replication batches and is replicated to and commit in the second database in a single transaction. In this case, according to embodiments, the transaction batches are generated and immediately replicated in response to receiving a read request for which the hybrid DBMS determines that the read request shall be executed at least partially by the second engine on a second instance of the table in the second database. The definition of a particular replication batch's borders and the triggering of replicating a current batch in response to determining that a received (read) query shall be dispatched to the second engine may have the advantage that it is ensured that a sync time and corresponding new table rows exist in the second database which correspond exactly to the state of the first database (or at least the state of the tables to be accessed by the query) at the moment of receiving the query. The new data records generated by the replication module in the second database have assigned the sync time of committing a single replicated transaction or a batch of replicated transaction as time stamp or version number. The second engine, upon executing the dispatched query or parts thereof, evaluates the version numbers (sync times used as time stamps) of the data records in the accessed tables to selectively process the table rows having a sync time as version number that is mapped to the particular state time corresponding to the latest committed transaction in the first database.

Figure 3B:
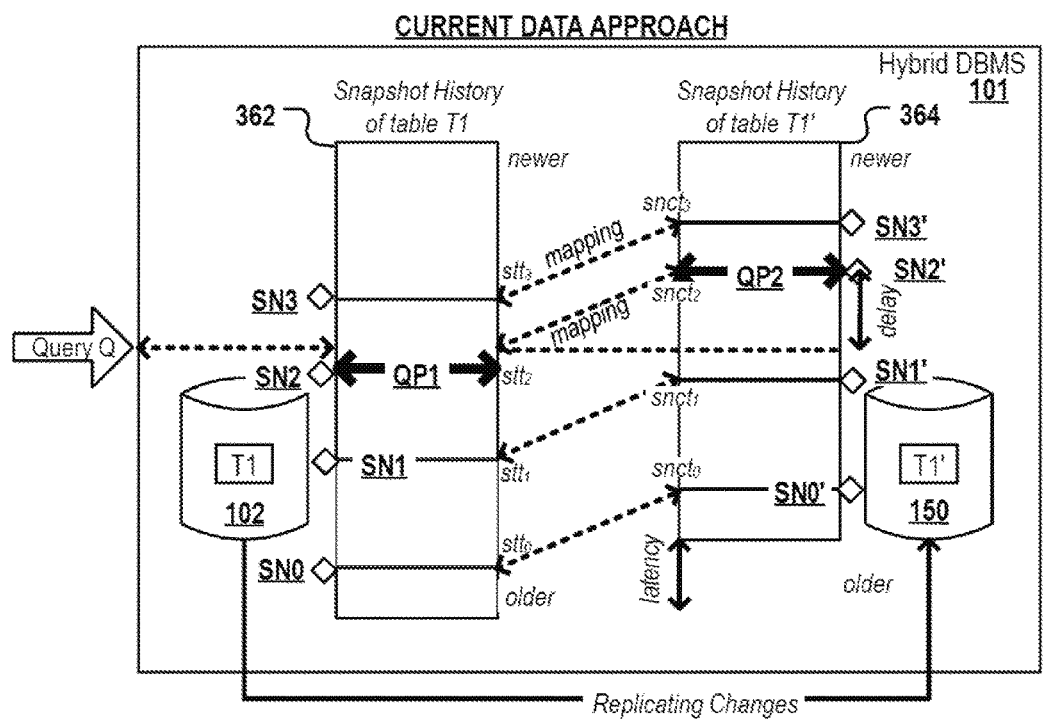
FIG. 3B depicts the distributed execution of parts of a query on different engines of a hybrid DBMS according to the "current data approach".

FIG. 3B depicts the distributed execution of parts of a query on different engines of a hybrid DBMS according to the "current data approach". The time point when a query Q arrives at the hybrid DBMS is depicted with an arrow and a dotted line. The hybrid DBMS evaluates the query to determine if the query should be executed solely by the first or solely by the second or partially by the first and partially by the second engine. In response to determining that the query shall be executed completely or partially by the second engine, the hybrid DBMS determines in the current data approach a current state time stt2 which corresponds to the commit time of the most recently committed write statement on table T1 (if the mapping is implemented as a database-wide mapping, the current state time stt2 would be the commit time of the most recently committed write statement on any table in the first database). The hybrid DBMS then evaluates a mapping of state times and sync times for determining if the snapshot SN2 of table T1 has already been replicated to the second database so that the second engine can execute the received and dispatched query or parts thereof. If the mapping contains an assignment of the current state time stt2 to a corresponding sync time snct2, the first and second engine can start execution on their respective parts of the query (if any) immediately. If the mapping does not comprise an assignment of the current state time stt2 to a corresponding sync time snct2 at the time of query arrival (this situation is depicted in FIG. 3B because the sync time snct2 is later than the dotted line representing the moment of query arrival at the hybrid DBMS), the first engine can start execution on its respective parts of the query (if any), but the execution of the second engine is delayed until the assignment of stt2 to snct2 was stored in the mapping. For example, the mapping may be regularly evaluated by a dispatcher module of the hybrid DBMS to determine whether the changes of the most recently committed transaction or of the transaction batch comprising the transaction have been replicated to the second database or not. The "logical state" on which the first engine executes a first part of the received query is represented as arrow QP1 and the "logical state" on which the second engine executes a second part of the received query is represented as arrow QP2. Thus, the example according to the current data approach depicted in FIG. 3B may ensure that both the first and second engine operate on the same and on the most current data available. However, in some cases the second engine will have to wait until the replication process has caught up.

Figure 3C:
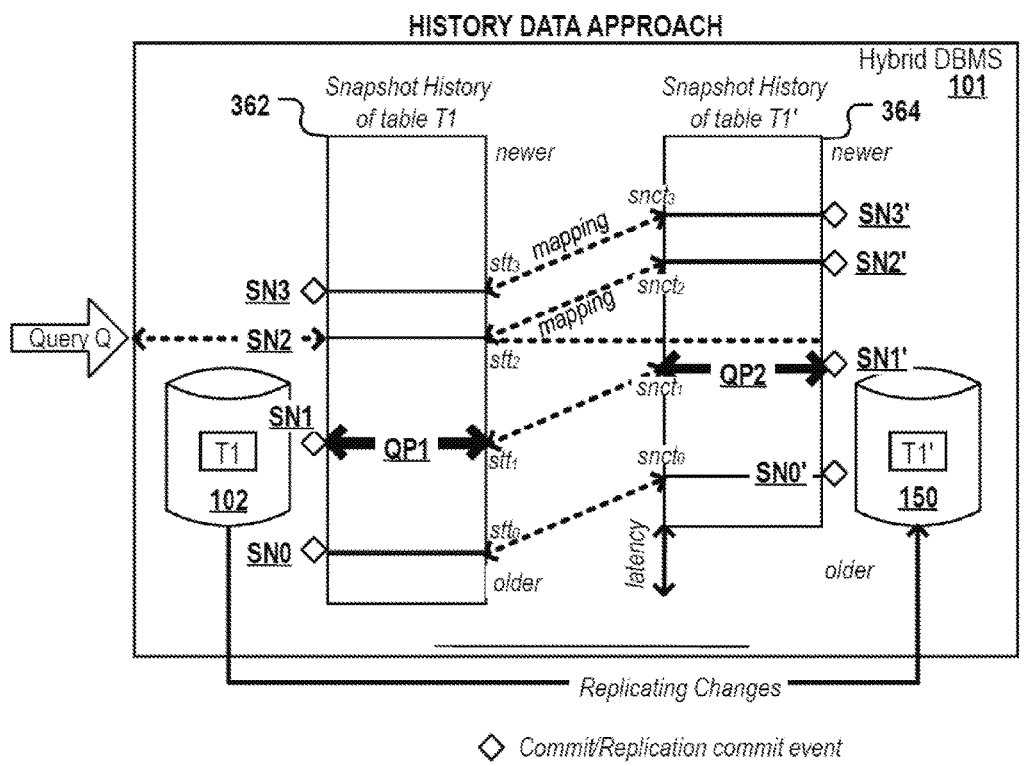
FIG. 3C depicts the distributed execution of parts of a query on different engines of a hybrid DBMS according to the "history data approach".

FIG. 3C depicts the distributed execution of parts of a query on different engines of a hybrid DBMS according to the "history data approach". The time point when a query Q arrives at the hybrid DBMS is depicted with an arrow and a dotted line. The hybrid DBMS evaluates the query to determine if the query should be executed solely by the first or solely by the second or partially by the first and partially by the second engine. In response to determining that the query shall be executed completely or partially by the second engine, the hybrid DBMS accesses a mapping of state times and sync times for determining the most recent sync time, i.e., the snapshot that has been replicated to and has committed in the second database most recently.

In the depicted example, this sync time, also referred to as the "current sync time", would be snct1 as at the moment of query arrival the changes introduced in a time interval stt1-stt2 are still in the process of replication but have not committed yet. The current sync time snct1 is the most recent sync time having assigned a state time in the mapping. Then, the state time mapped to the most recent sync time is determined. In the depicted example, this state time ("history state time") is stt1. After having determined the snapshot and corresponding state time stt1 and sync time snct1, the first and second engine immediately start executing their respective parts of the query, if any "Immediate" may imply that the second engine does not wait until any ongoing replication batch has committed. The "logical state" on which the first engine executes a first part of the received query is represented as arrow QP1 and the "logical state" on which the second engine executes a second part of the received query is represented as arrow QP2. Thus, the example according to the history data approach depicted in FIG. 3C may ensure that both the first and second engine operate on the same logical state of the data and start operating immediately without any delay caused by the replication latency. However, this approach may not guarantee that the first and second engine operate on the most current data available.

According to some embodiment, the query and/or a configuration of the hybrid DBMS contains an indication, e.g. a flag, that specifies whether the hybrid DBMS should process a query according to the current data approach (if the most current data is required and short delays are acceptable) or according to the history data approach (if the result should be obtained as fast as possible and if it is acceptable that the processed data may not the most recent data available).

The first engine must not delete data rows having been created by previous transactions (and having a corresponding state time stamp as a version number) as long as a query or query part currently executed by the second engine could still require it (even though no query or query part currently processed by the first engine requires it any longer). The replication module or another module of the hybrid DBMS is configured to maintain the mapping between the state times and the sync times corresponding to the same state of the data. For example, this can be done by evaluating the log of the first engine for determining log-record-IDs that can be used as state times and by using MVCC version numbers or log record IDs generated by the second engine or an MVCC module coupled to the second engine for determining replication commit times in the second database. The replication logic is configured to selectively replicate transactionally consistent states (i.e. snapshots). All the mapping update logic needs to do is determine the internal snapshot identifier of every snapshot created in the first and in the second database.

Typically, the state times and sync times are not used by client applications for submitting time-dependent SQL queries. The state times and sync times may not even be visible to client applications. The state times and sync times and the corresponding mapping is used automatically by the hybrid DBMS to ensure a consistent execution even of partial queries, i.e. of queries that are split into two or more parts which are then executed by different engines on different instances of the source data. Thus the state time stamps and sync time stamps may be defined and be visible only to internal modules of the hybrid DBMS. By using standard multi-version concurrency control (MVCC) functionalities, some aspects related to the snapshot and row version number management which already exist may be used for a different purpose (executing partial queries on a single consistent snapshot). Even though changes happen in the data while the query runs, the query is isolated from them by reading only the older snapshot/version (identified via a particular sync time) that existed at query arrival time. However, instead of MVCC, also other forms of hybrid DBMS which do not comprise an inbuilt MVCC functionality may be used.

Figure 4A:
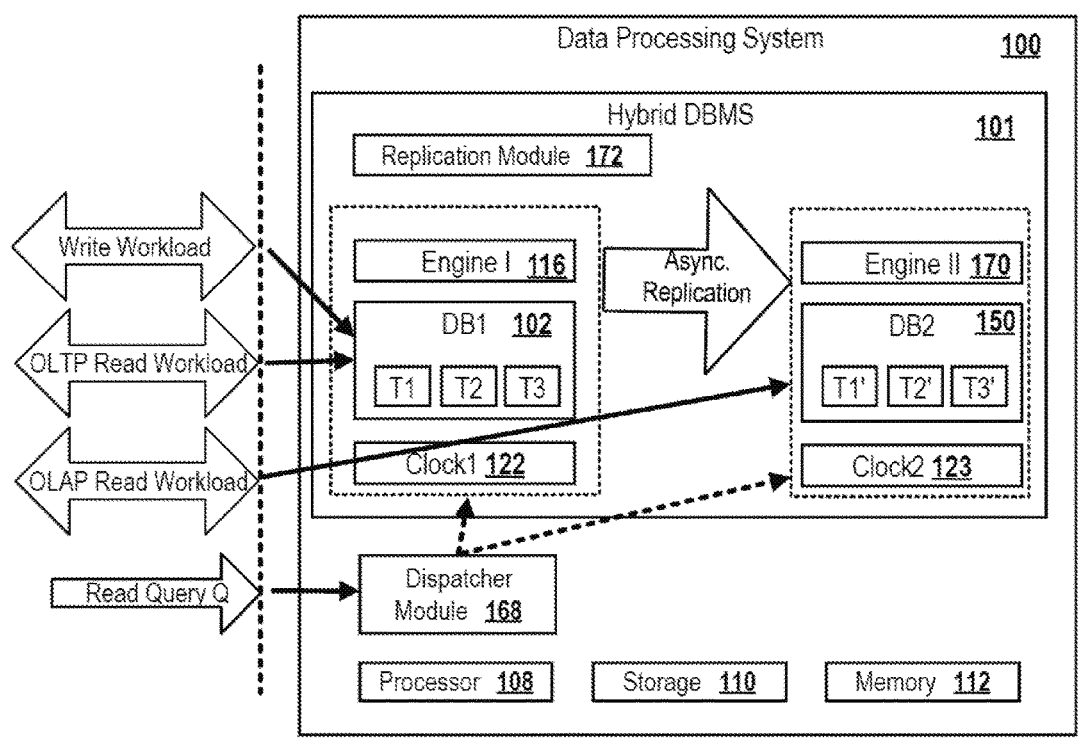
FIG. 4A depicts a block diagram of a hybrid DBMS according to an embodiment.

FIG. 4A depicts a block diagram of a data processing system 100 hosting a hybrid DBMS 101 according to one example implementation. The hybrid DBMS is hosted on a single computer system comprising one or more processors 108, one or more non-volatile storage devices 110 and comprising program logic for executing the method according to embodiments of the disclosure. The system in addition contains a main memory 112 that is used both by the first and by the second database engine. The data replication and/or the query dispatching is performed via a bus system of data processing system 100.

The hybrid DBMS contains at least a first database engine 116, e.g. an OLTP engine and a second engine 170, e.g. an OLAP engine. The first engine 116 maintains a first database 102 comprising one or more database tables T1, T2, T3. The second engine 170 maintains a second database comprising further instances T1', T2', T3' of the tables, whereby a replication module 172 repeatedly replicates data from the source table instances T1, T2, T3 to the target table instances T1', T2', T3'. The hybrid DBMS contains a dispatcher module 168 that dynamically decides if a particular query should be executed a) solely by the first engine on the source table instances of the first database or b) should be sent to the second engine for causing the second engine to execute the query on the target table instances in the second database or c) should be split into at least a first query part to be executed by the first engine and a second query part to be executed by the second engine. The first and/or second database may comprise tables for which no respective table instance exists in the other database of the hybrid DBMS. In this case, the dispatcher module sends the query or query part to the one of the engines which maintains the database that contains the single instance of the table(s) to be accessed by the query.

The first engine contains or is interoperable with a first clock 122 configured for determining the time in a first temporal reference system, e.g. by using WAL log entry-IDs of a log of the first engine. For example, in case the hybrid DBMS 101 receives a query, the hybrid DBMS may cause the first clock to determine a current time as the first time and store it or a value derived therefrom in association with the query. The first clock determines the time in a first temporal reference system. The first clock may be, for example, a system configured for extracting WAL entries from a log of the first engine or a first MVCC system configured for managing multiple versions of data rows stored in tables of the first database 102.

The second engine contains or is interoperable with a second clock 123 configured for determining the time in a second temporal reference system, e.g. by using WAL log entry-IDs of a log of the second engine. For example, in case the replication module has successfully replicated a batch comprising the data changes of a plurality of transactions, the replication module may cause the second clock to determine a time when current replication batch has committed in the second database and delay execution of the received query by the second engine until the event was observed. All data records in target table instances having assigned a batch-ID that is younger than the batch-ID associated with the query are ignored by the second engine. The second clock determines the time in a second temporal reference system. The second clock may be, for example, a system configured for extracting WAL entries from a log of the second engine or a second MVCC system configured for managing multiple versions of data rows stored in tables of the second database 150.

For example, the first engine may be an OLTP engine, the second engine may be an OLAP engine and the dispatcher module may be configured to dispatch write workload queries and OLTP read workload queries exclusively to the first engine and dispatch OLAP workload queries exclusively to the second engine. The first engine is configured for executing a plurality of write transactions, e.g., OLTP transactions. Thereby first instances T1, T2, T3 of one or more database tables are changed in the first database, e.g. by performing an INSERT, UPDATE or DELETE statement. The replication module 172 is configured for asynchronously replicating changes introduced to the first database by individual transactions or by a plurality of transactions which are pooled to form one or more replication batches. The replication process and also the pooling process may be performed in the background and asynchronous to the query execution by the first and second engines.

Queries of a mixed type, e.g. a query that performs a write (INSERT) operation for inserting an aggregated intermediate result generated by aggregating large amounts of data may be split into two sub-queries: the data aggregation task for generating intermediate results may be dispatched to the second engine and may be executed in the second database. The aggregated results may be stored via one or more write transactions by the first engine in the first database. It is also possible that pure read queries are split and executed partially by the first and partially by the second engine. The results returned by the two engines are combined later, e.g. by a UNION operation performed by the dispatcher module.

Thus, once the hybrid DBMS receives a query, the dispatcher module may analyze the query and/or system parameters for dynamically determining if the query should be executed according to the option a) entirely by the first engine, b) entirely by the second engine, or c) in part by the first engine and in part by the second engine. In some example implementations, the dispatcher module may in addition automatically and in response to receiving the query determine if the query execution should be performed in accordance with the current data approach or in accordance with the history data approach. For example current system parameters like current replication latency time, current CPU load of the CPU(s) used by the first engine, CPU load of the CPU(s) used by the second engine, and/or configuration parameters ("flags", or "annotations") in the query or in a configuration file of the hybrid DBMS are determined. The dispatcher module evaluates the parameters for deciding if a current query, e.g. a read query, should be executed by the first or by the second or partially by both engines and for determining the approach to be used by the engines of the hybrid DBMS for executing the query. For example, if the load of the second engine is high and the load of the first engine is low, the dispatcher module may dispatch the received query fully or at least partially to the first engine. If the replication latency time is above a threshold, the dispatcher module may dispatch the received query fully or at least partially to the first engine. If the query contains a first and a second query part and if the dispatcher module determines that the first part can be performed by the first engine faster than by the second engine while the second part can be performed by the second engine faster than by the first engine, the first part will be dispatched to the first engine and the second part will be dispatched to the second engine. If a parameter in the query or in the configuration file indicates that the most current data is needed, the hybrid DBMS will process the received query according to the current data approach. If a parameter in the query or in the configuration file indicates that it is not necessary to execute the query on the most current data available, the hybrid DBMS will process the received query according to the history data approach.

The hybrid DBMS uses the first clock 122 for assigning logical time stamps, referred to herein as "state times", to table rows in the first database upon a commit of a write transaction executed by the first engine on the table rows. The hybrid DBMS uses the second clock 123 for assigning logical time stamps, referred to herein as "sync times", to table rows of the second database upon a commit of a replication operation executed by the replication module and/or the second engine on the table rows. The first clock and the second clock operate independently from each other and thus represent different temporal reference systems. For example, one clock may be a "real" clock measuring a time in absolute numbers (date, hours, seconds, etc.) while the other clock may be a MVCC module generating a chronological series of version ids for new or modified data rows. The hybrid DBMS maintains a continuously updated mapping of state times and sync times for enabling the dispatcher module 168 to identify table rows in the first and second database having assigned a state time or a sync time which represent the same state of the data (the same "snapshot"). This allows the first and second engines to execute their respective parts of the query exactly and exclusively on table rows having assigned the identified state time or sync time, thereby filtering out and ignoring any data rows having an older or a younger state time or sync time.

For example, the version numbers that are assigned by many MVCC modules today to currently modified rows can be used as state time and the MVCC version number generator can be used as first clock.

Figure 4B:
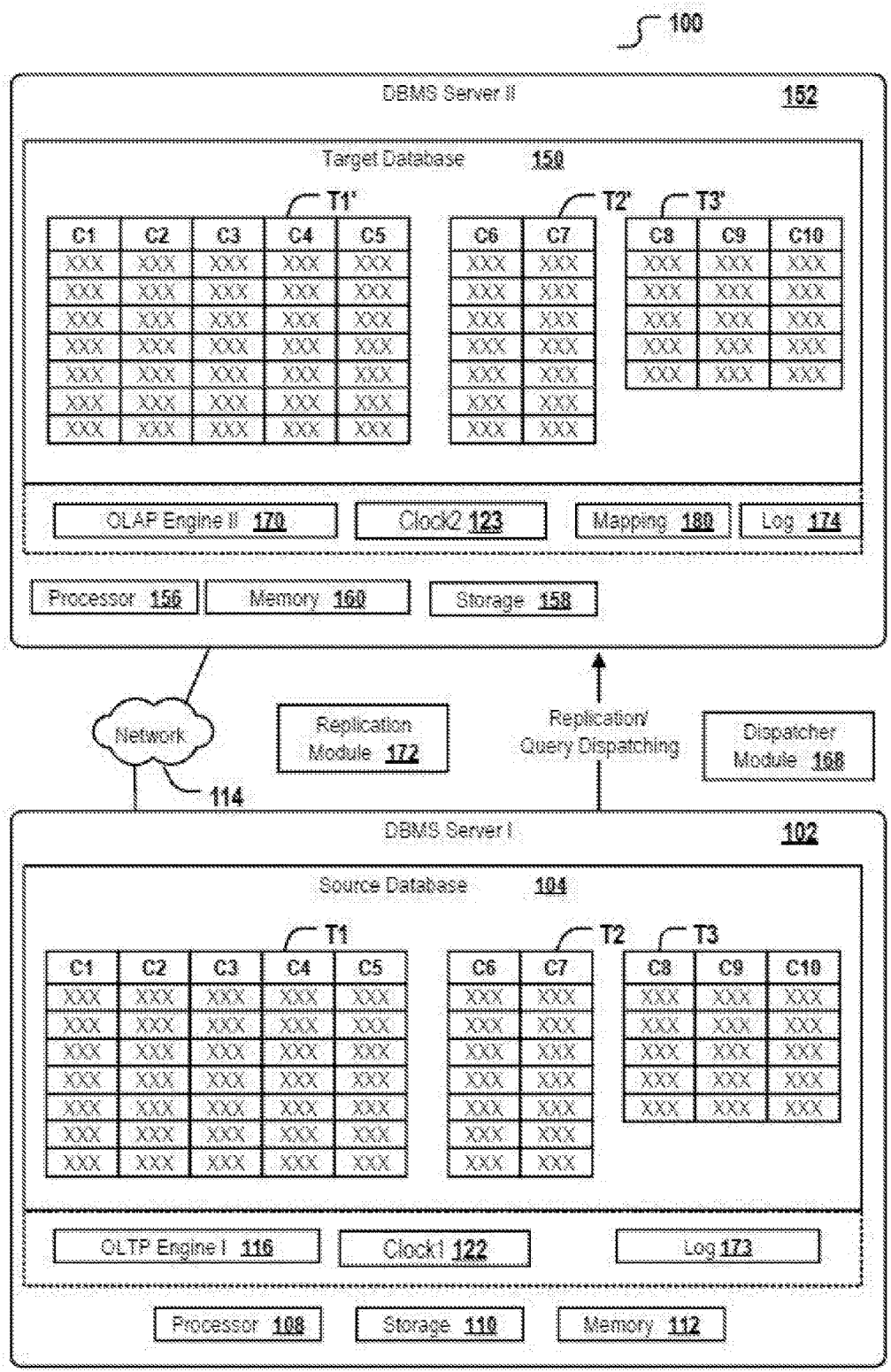
FIG. 4B depicts a block diagram of a hybrid DBMS according to a further embodiment.

FIG. 4B depicts a block diagram of a hybrid DBMS according to a further embodiment in greater detail. According to the example embodiment depicted in FIG. 4B, the hybrid DBMS is a distributed hybrid DBMS whose engines and corresponding databases are hosted on at least two different computer systems 102, 152 connected to each other via a network connection 114, e.g. the internet. The first computer system hosts the first database 104 with the source table instances T1, T2, T3, the first engine 116, e.g. an OLTP engine, and a first clock 122 and contains a log file 173 of the first engine. The first computer system 102 may be a server computer or a cloud service environment comprising one or more processors 108, one or more storage devices 110 and a main memory 112. The replication module 172 and the dispatcher module 168 may be hosted on any one of the two computer systems or on a further computer system. The second computer system hosts the second database 150 with the target table instances T1', T2', T3', the second engine 116, e.g. an OLAP engine, and a second clock 123 and contains a log file 174 of the second engine. The second computer system 152 may be a server computer or a cloud service environment comprising one or more processors 156, one or more storage devices 158 and a main memory 160. The engines and modules of the system depicted in FIG. 4B functionally correspond to the features described already for FIG. 4A.

Figure 5:
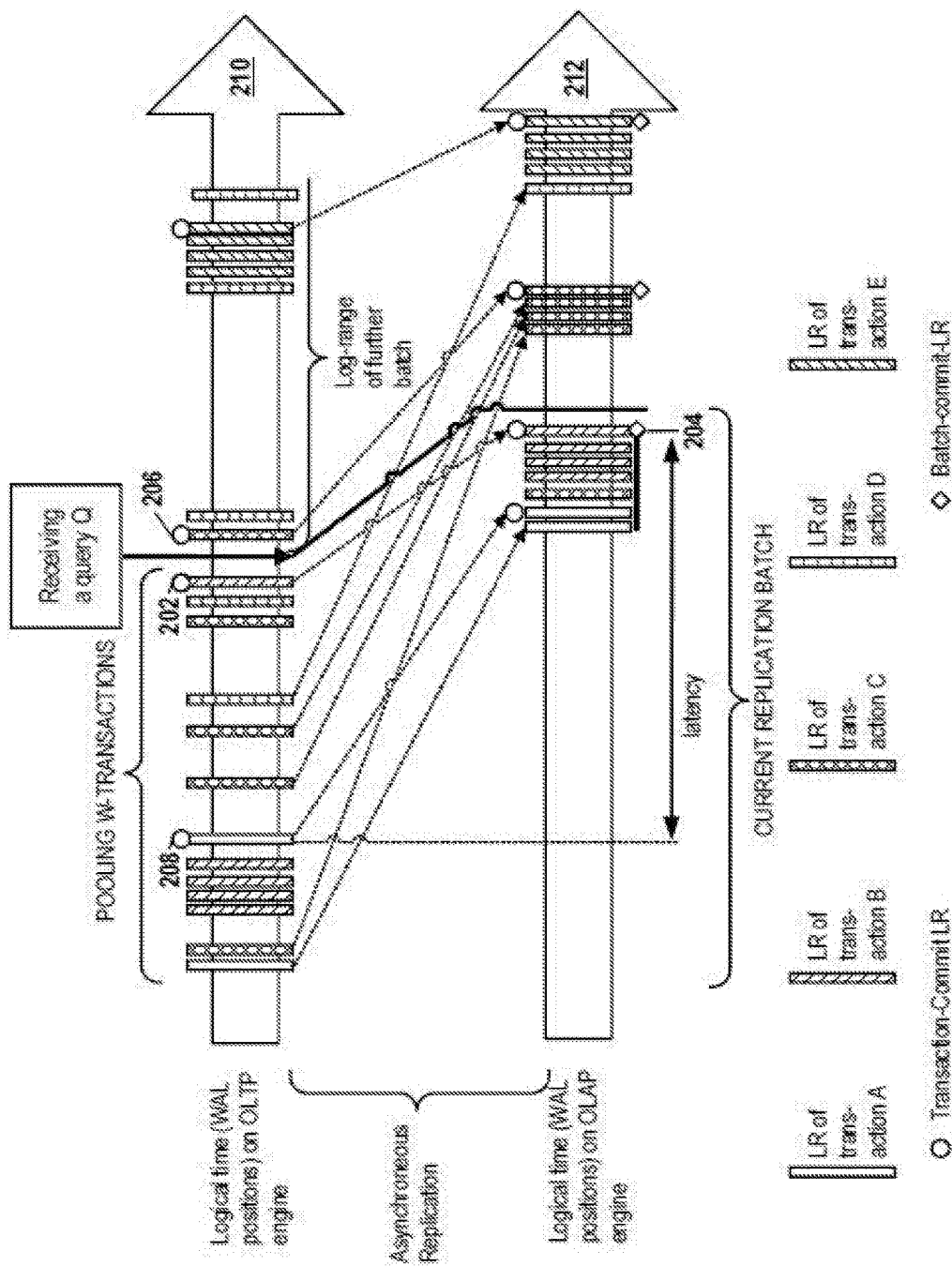
FIG. 5 depicts the definition of a replication batch in response to the receipt of a query.

FIG. 5 depicts the definition of a replication batch in response to the receipt of a query Q. The large arrow at the top of the figure, arrow 210, represents logical times determined by a first clock of the first engine. The logical times, also referred to as "state times", may be stored in a log of the first engine, e.g. in the form of log record IDs or MVCC version numbers. The large arrow at the bottom of the figure, arrow 212, represents logical times ("sync times") determined by a second clock of the second engine. The sync times may be stored in and derived from a log of the second engine or may be version numbers of an MVCC module coupled to the second engine. Each bar crossing the upper arrow represent a log record ("LR") corresponding to the time of executing one or more SQL statements by the first engine. SQL statements corresponding to the same transaction are depicted with the same type of hatching. The commit statement of each transaction (which may correspond to multiple bars of the same hatching) is indicated by a circle, e.g. circle 206, on top of the respective bar. The diamond on the bottom of the commit transaction bars covering the second, lower arrow, e.g. diamond 204, represent the logical time of a replication batch commit event that is determined by a second clock used by the second engine. The replication module is configured to asynchronously replicate changes of the first instance of one or more tables to a respective second instance of the table(s). Each replicated change is stored in association with a sync time of committing the changes in the second instance of the table.

As can be inferred from FIG. 5, a query Q is received by the hybrid DBMS at a particular moment in time. The query Q may be a query for reading data from a particular table T1. At the time of receiving the query Q by the hybrid DBMS, the transactions A and B have already committed in the first database, see circles 202 and 208. In addition, some statements of transactions C and D were executed by the first engine but the transactions C and D have not committed at the time of receiving the query, note that circle 206—the commit time for transactions C—occurs after the query Q. The first statement of transaction E is not executed by the first engine until after the receipt of the query.

At the moment of receiving the query Q, the first engine may execute a plurality of write transactions, e.g. transactions C and D, on a particular first table T1 in the first database. Thereby, the first engine stores new or modified table rows in table T1, whereby upon a commit event in the first database the row created by the committed transaction is stored in association with a current state time. Thus, the state time assigned to each data row in table T1 is the commit time of the transaction having introduced the change.

In response to receiving the query Q against the table T1, the first engine identifies a "query state time". The query state time is the commit time of the one of the plurality of write transactions having committed most recently before the receipt of the query. In the depicted example, the most recently committed transaction is transaction B having a commit state time 202. Then, the data processing system (e.g. a module of the hybrid DBMS) determines if a) the query shall be performed completely by the first engine or b) the query shall be performed completely by the second engine or c) a first part of the query shall be performed by the first engine and a second part of the query shall be performed by the second engine.

If case a) or c) is determined, the first engine immediately executes at least the first part of the query against the first instance of the table T1 using the query state time 202 as a filter to exclude any changes in the first table instance (i.e., any table rows in T1) having assigned a state time that chronologically follows (comes later than) the identified query state time 202. Thereby, the first engine generates a first result.

If case b) or c) is determined, the second engine or another component of the hybrid DBMS, e.g. the dispatcher module, evaluates the mapping for identifying a query sync time. The query sync time is the time when all changes in the first table instance having committed before the query state time have been replicated. In the depicted example, the query sync time is indicated by the diamond 204. Thus, the query state time 202 and the query sync time 204 correspond to the same state ("snapshot") of the data content of the table instances T1, T1'. This corresponds to FIG. 3B wherein stt2 is the query state time and snct2 is the mapped query sync time.

The hybrid DBMS delays the execution of the complete query—as in case b)—or delays the execution of the second part of the query—as in case c)—until the identified query sync time is reached. For example, the mapping of state times and sync times is monitored and the moment when a new assignment (mapping table row) is created in the mapping that assigns state time 202 to sync time 204, the "sync time is reached" and the table T1' has the same state as table T1 at the moment of receiving the query.

After the query sync time, i.e., after the second instance T1' of the table has reached the same state as the first instance T1 of the table, the second engine executes the received query—as in case b)—or executes the second part of the query—as in case c)—against the second instance T1' of the table. Thereby, the query sync time 204 is used as a filter to exclude any changes (table rows in T1') having been replicated to the second table instance which have assigned a sync time that chronologically follows the identified query sync time. The execution of at least the second part of the query generates a second result.

In a final step, the first result, the second result, or, in case c), a combination of the first and second result is returned as the final result to a client application.

According to some implementation examples, the data replication is performed in the form of batches whose creation is triggered by receiving a query Q that is at least partially dispatched for execution to the second engine. The receipt of the query Q is the trigger for stopping pooling all changes of the data in the first database and for creating a "mini" batch that selectively contains all data changes of uncommitted transactions having committed at or before the query state time 202. Thus, the generated mini batch would comprise all statements of transactions A and B but none of C, D and E, because none of the transactions C, D and E have committed before the first time 202 (transaction E has not even started to be executed by the first engine). The batch is replicated as a "current replication batch" to the second database, whereby the replication has a latency time, typically in the range of a few seconds or fractions thereof depending on the size of the mini batches which again depends on the pattern of the received write/read queries. The second clock of the second engine, e.g. an MVCC system using WAL log record IDs as time stamps, determines the moment of successfully committing all changes specified in the current replication batch. The moment is depicted as the diamond 204 and is identical for all transactions (here: A and B) replicated to the second database via the current replication batch. Upon the replication of the current batch has been completed, the query is executed by the second engine, whereby the second engine uses the query sync time 204 (which may be used as a batch-ID of the current replication batch) to ignore all data records in table T1' having assigned a younger sync time (measured e.g. as WAL positions) than the query sync time 204 corresponding to the completion of replicating the current batch. Consequently, the changes imposed by the transactions C, D and E are not visible to the query executed by the second engine even in case they should have been also replicated when the second engine starts processing Q.

Thus, the query state time 202 is used as a "first visibility filter" as the first engine when executing the first part QP1 of the query selectively processes data rows of T1 having assigned the query sync time as a version ID and the query sync time 204 is used as a "second visibility filter" as the second engine when executing the second part QP2 of the query selectively processes data rows of T1' having assigned the query sync 204 time as a version ID.

Using replication batches may increase performance of replication as multiple transactions may be replicated in the form of a single, large transaction or a batch. Creating the batch and starting its replication in response to receiving a query that is to be dispatched at least partially to the second engine may ensure that the same snapshot "seen" by the query in the first database (or tables to be accessed) is also "seen" in the second database.

As the batches are induced by the receipt of queries which are to be dispatched to the second engine, the typical batch size is comparatively small ("mini batches"). This may further accelerate performance. In particular in a hybrid DBMS comprising an OLTP and an OLAP engine, replicating changes from a first to a second engine may be a very performance-sensitive task. By design, the OLTP engine is usually optimized for large amounts of small write requests, while the OLAP engine is optimized for executing complex analytic queries. The OLAP engine often sacrifices data write performance, since large amounts of small updates are considered atypical for traditional OLAP systems. Therefore simply duplicating the stream of incoming write requests from the OLTP engine to the OLAP engine can put a much higher burden on the OLAP engine. At the same time, the synchronization delay from the OLTP engine to the OLAP engine gets added to the query execution time in the "most recent commit" consistency scenario, so the small size of the batches helps to keep synchronization delay small compared to the savings of executing OLAP queries on the specialized OLAP engine.

According to some examples, the generation of the batch may comprise computing a net effect of all changes specified in a plurality of transactions specified in the batch which relate to the same data record. Transaction commits have a significant impact on write performance on almost all database systems. They must enforce the persistence of the committed data and therefore usually result in comparatively expensive writes to persistent storage (disk flushes). By combining multiple update transactions on the OLTP engine, which occurred over a small time window, into a single write transaction on the OLAP engine (net result computation of multiple pooled transactions), the number of commits in the second database can be significantly reduced.

Net-effect processing as described above cannot generally be applied across multiple source transactions that are combined in one mini-batch: even though the mini-batch is a single transaction, it may still need to create multiple versions of the same row that need to be visible to different queries, based on their submission timestamps. In case no further query to be executed by the second engine was submitted between two or more consecutively committing transactions on the first engine, these transactions can be combined and the same second time (or corresponding first time) may be assigned as batch-ID to the data row comprising the computed net effect of the combined transactions by the replication module. This allows performing net-effect processing over all replicated changes with the same batch-ID, because as the batches are created upon receipt of a query to be executed by the second engine, there is no query that might need to see the intermediate versions.

Moreover, it may not be necessary to maintain transaction-specific version numbers (transaction-specific sync times) for each replicated transaction as in case there are no queries received for processing data at a defined moment in time. Thus, all data rows created by replicating a particular batch may have assigned the sync time at which the batch commits in the second database as their version number.

In case the history data approach is chosen, the creation of replication batches in response to receiving a query may also be used, but likewise any other trigger for creating a replication batch could be used. For example, the batch could be replicated upon having reached a predefined size or after a predefined time interval of pooling transactional changes has lapsed. As the first and the second engine can start to perform their respective query parts immediately after the most current already replicated data snapshot of the table to be accessed (or of the whole database) was identified, there does not exist any delay related to the latency of replicating a current batch.

What is claimed is:

1. A computer-implemented method for processing a query against a database table in a data processing system, the method comprising:

mapping a state time and a sync time, the state time specified in a first temporal reference system used by a first database engine for maintaining a first instance of a database table, the sync time being specified in a second temporal reference system used by a second database engine for maintaining a second instance of the database table, wherein the second instance of the database table at a particular sync time shares a state with the first instance of the database table at a particular state time corresponding to the particular sync time;

identifying a change made to the first instance of the database table, the change being introduced by a write transaction executed by the first database engine at a commit time, the change creating a new state of the first instance of the database table, the change stored in association with a state time indicating the commit time of the write transaction that introduced the change;

asynchronously replicating the change to the second instance of the database table, the replicated change being stored in association with a sync time indicating when the change was committed to the second instance of the database table and mapped to the state time indicating the commit time of the write transaction that introduced the change;

receiving a first query against the database table, the first query having at least a first part and a second part, and in response:

identifying a first query state time, the first query state time being the commit time of a write transaction having committed most recently before the receipt of the first query;

determining that the first part of the first query shall be performed by the first database engine and the second part of the first query shall be performed by the second database engine;

immediately executing at least the first part of the first query against the first instance of the database table using the query state time as a filter to exclude any changes in the first table instance having a state time that chronologically follows the identified query state time, the execution of at least the first part of the first query generating a first result;

identifying a query sync time, the query sync time being the time when all changes in the first table instance having committed before the query state time have been replicated;

delaying the execution of at least of the second part of the first query until the identified query sync time;

executing at least the second part of the query against the second instance of the database table using the query sync time as a filter to exclude any changes in the second table instance having assigned a sync time that chronologically follows the identified query sync time, the execution of at least the second part of the query generating a second result; and returning a combination of the first and second result as a final result.

2. The computer-implemented method of claim 1, further comprising receiving a second query against the database table, the second query having at least a first part and a second part, and in response:

identifying a second query state time, the second query state time being the commit time of a write transaction having committed most recently before the receipt of the second query;

determining that the second query shall be performed completely by the first database engine;

immediately executing the second query against the first instance of the database table using the second query state time as a filter to exclude any changes in the first table instance having a state time that chronologically follows the identified second query state time, the execution of the second query generating a third result; and returning the third result as a final result.

3. The computer-implemented method of claim 2, wherein determining that the second query shall be performed completely by the first database engine comprises automatically determining a current latency time for replicating changes from the first table instance to the second instance of the database table; and determining that the current latency time exceeds a replication latency time threshold.

4. The computer-implemented method of claim 1, further comprising receiving a third query against the database table, the third query having at least a first part and a second part, and in response:

identifying a third query state time, the third query state time being the commit time of a write transaction having committed most recently before the receipt of the third query;

determining that the third query shall be performed completely by the second database engine;

identifying a second query sync time, the second query sync time being the time when all changes in the first table instance having committed before the third query state time have been replicated;

delaying the execution of the third query until the identified query sync time;

executing the third query against the second instance of the database table using the third query sync time as a filter to exclude any changes in the second table instance having assigned a sync time that chronologically follows the identified second query sync time, the execution of the third query generating a fourth result; and returning the fourth result as a final result.

5. The computer-implemented method of claim 1, further comprising computing the final result by combining the first and second result via an SQL operation.

6. The computer-implemented method of claim 1, wherein determining that the first part of the query shall be performed by the first database engine and the second part of the query shall be performed by the second database engine comprises automatically determining that the received query is configured to access at least a first and a second table, an instance of the first table being maintained by the first database engine but not by the second database engine, an instance of the second table being maintained by the second database engine but not by the first database engine and, in response to this determination, determining that the query shall be executed in part by the first database engine and in part by the second database engine.

7. The computer-implemented method of claim 1, wherein determining that the first part of the query shall be performed by the first database engine and the second part of the query shall be performed by the second database engine comprises automatically evaluating the received query, the received query comprising one or more read statements of a first type and one or more read statements of a second type, the first database engine being speed-optimized for performing the first type of statement and the second database engine being speed-optimized for performing the second type of statement, and determining that the query shall be performed by performing the statements of the query of the first type by the first database engine and by performing the statements of the query of the second type by the second database engine.

8. The computer-implemented method of claim 1, each state time being selected from a group comprising:

a time measured by a clock operatively coupled to the first database engine upon a commit event of a write transaction in a first database maintained by the first database engine;

a transaction-ID generated by the first database engine upon a commit event of the transaction;

an MVCC version number generated by a first MVCC module operatively coupled to the first database engine; and a log-record-ID generated by the first database engine upon logging a commit event of the transaction in a first database maintained by the first database engine.

9. The computer-implemented method of claim 1, each sync time being selected from a group comprising:

a time measured by a clock operatively coupled to the second database engine upon a commit event of a write transaction in a second database maintained by the second database engine;

a transaction-ID generated by the second database engine upon a successful replication of the transaction to a second database maintained by the second database engine;

an MVCC version number generated by a second MVCC module operatively coupled to the second database engine; and a log-record-ID generated by the second database engine upon logging a successful replication of the transaction to a second database maintained by the second database engine.

10. The computer-implemented method of claim 1, the replication of the changes comprising:

assigning, to each transaction to be replicated, a state time indicative of the commit time of the transaction in a first database managed by the first database engine;

upon having successfully replicated any one of the transactions to a second database managed by the second database engine, determining a sync time being indicative of the time of completing the replication; and storing a new entry in the mapping, the new entry comprising an assignment of the state time assigned to the transaction and the sync time determined upon successful replication of the transaction.

11. The computer-implemented method of claim 10, wherein the replication is executed by generating, in response to receiving a query, a replication batch comprising one or more changes made in the first database, maintained by the first database engine, before the receipt of the query, the sync time for the replication batch determined by the time all changes specified in the batch are replicated to the second database, maintained by the second database engine.

12. The computer-implemented method of claim 11, wherein the replication of the replication batch comprises:

evaluating write statements in the replication batch for identifying multiple write statements configured to modify the same row of the database table;

processing the identified multiple write statements for computing a net effect change that would result if all the identified multiple write statements would be applied on the row; and instead of storing a respective row for each of the identified multiple write statements in the second instance of the database table, solely storing a single new row with the computed net effect change in the second instance of the database table.

13. The computer-implemented method of claim 1, the method further comprising:

automatically identifying all table rows in the second instance of the database table assigned a sync time that is older than a query sync time used as filter by any query or query part that is currently executed by the second database engine and for which a newer row version with a younger sync time exists in the second table instance;

marking any one of the identified table rows as deletion candidate; and automatically and asynchronously to the query execution, physically deleting the marked table row from the second database.

* * * * *